United States Patent
Kimura et al.

(10) Patent No.: US 8,720,660 B2
(45) Date of Patent: May 13, 2014

(54) PARKING LOCK MECHANISM OF POWER TRANSMISSION APPARATUS

(75) Inventors: Hiromichi Kimura, Okazaki (JP);
Michitaka Tsuchida, Miyoshi (JP);
Takeshi Kitahata, Toyota (JP); Tatsuo Obata, Toyota (JP); Yosuke Suzuki, Susono (JP); Takeshi Kuwahara, Nisshin (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 13/696,875

(22) PCT Filed: May 10, 2010

(86) PCT No.: PCT/JP2010/003155
§ 371 (c)(1),
(2), (4) Date: Jan. 17, 2013

(87) PCT Pub. No.: WO2011/141947
PCT Pub. Date: Nov. 17, 2011

(65) Prior Publication Data
US 2013/0134010 A1    May 30, 2013

(51) Int. Cl.
*B60W 10/18*    (2012.01)

(52) U.S. Cl.
USPC ........................................ 192/219.5

(58) Field of Classification Search
USPC .............. 192/219.5, 219.4, 219, 218, 215; 74/606 R, 607, 606 A
See application file for complete search history.

(56) References Cited

U.S. PATENT DOCUMENTS

| | | | | |
|---|---|---|---|---|
| 4,606,242 | A * | 8/1986 | Hasegawa et al. | 74/606 R |
| 7,364,027 | B2 * | 4/2008 | Matsubara et al. | 192/219.5 |
| 7,383,933 | B2 * | 6/2008 | Reed et al. | 192/219.5 |
| 7,493,999 | B2 * | 2/2009 | Reed et al. | 192/219.5 |
| 8,240,448 | B2 * | 8/2012 | Hongawara et al. | 192/219.5 |
| 8,490,770 | B2 * | 7/2013 | Schwekutsch et al. | 192/219.5 |
| 2007/0062779 | A1 | 3/2007 | Kusamoto et al. | |
| 2010/0108460 | A1 | 5/2010 | Nakamura et al. | |

FOREIGN PATENT DOCUMENTS

| | | |
|---|---|---|
| JP | 7-2665 | 1/1995 |
| JP | 7-9960 | 1/1995 |
| JP | 11-132319 | 5/1999 |
| JP | 2003-276580 | 10/2003 |
| JP | 2004-116738 | 4/2004 |
| JP | 2008-51174 | 3/2008 |
| JP | 2008-201162 | 9/2008 |
| JP | 2009-280178 | 12/2009 |

\* cited by examiner

*Primary Examiner* — David D Le
*Assistant Examiner* — David J Hlavka
(74) *Attorney, Agent, or Firm* — Finnegan, Henderson, Farabow, Garrett & Dunner, LLP

(57) ABSTRACT

Disclosed is a parking lock mechanism of a power transmission apparatus which can stably supply lubrication oil to the sliding surface of a parking cam to decrease the sliding resistance of the parking cam. The parking lock mechanism 52 includes a support portion 73 for positioning a sleeve 71 with respect to an extension housing 6, and a first guide rib 74 provided on the support portion 73 for catching oil circulating in a transaxle case 4 to supply the oil to the support portion 73. The sleeve 71 has an upper portion formed with a notch 71c for allowing a parking pawl 62 to be held in abutment with a parking cam 61. The oil caught by the first guide rib 74 is supplied through the support portion 73 and the notch 71c of the sleeve 71 to the sliding surface of the parking cam 61, viz., the sliding surface between the parking pawl 62 and the parking cam 61 and the sliding surface between the parking cam 61 and the sleeve 71.

6 Claims, 19 Drawing Sheets

PARKING LOCK MECHANISM OF POWER TRANSMISSION APPARATUS

CROSS-REFERENCE TO RELATED APPLICATIONS

This application is a national phase application of International Application No. PCT/JP2010/003155, filed May 10, 2010, the content of which is incorporated herein by reference.

TECHNICAL FIELD

The present invention relates to a parking lock mechanism of a power transmission apparatus, and more particularly to a parking lock mechanism of a power transmission apparatus for a vehicle such as an automotive vehicle and the like which can make it impossible for rotational elements and parts to be rotated.

BACKGROUND ART

In general, such a power transmission apparatus for a vehicle such as an automotive vehicle and the like is provided with a parking lock mechanism which is adapted to make it impossible for rotational elements and parts to be rotated by engaging a parking pawl with a parking gear secured to a rotation shaft forming part of the power transmission apparatus when the vehicle is manually shifted from its traveling range to its parking range for the stoppage of the vehicle.

As one of the conventional parking lock mechanisms of this kind is known a parking lock mechanism as shown in FIG. 21 (see for example Patent Document 1). The conventional parking lock mechanism shown in FIG. 21 comprises a manual shaft not shown) to be rotated in response to the operation of a shift lever to be operated by a driver, a detent lever 111, integrally connected with the manual shaft, and a parking rod 112 having one end potion connected with the detent lever 111, so that the parking rod 112 is axially moved in response to the swinging motion of the detent lever 111.

The parking rod 112 is disposed to be received in a cylindrical rod guide 113 with its forward end portion projecting toward a sleeve 114 adjacent to the parking rod 112. The forward end portion of the parking rod 112 has a parking cam 115 securely mounted thereon, and the sleeve 114 is formed with an inclined surface 114a allowing the parking cam 115 to slide thereon.

Above the sleeve 114 is provided a parking pawl 116, and above the parking pawl 116 is provided a parking gear not shown and rotated together with the rotation shaft.

The parking pawl 116 is formed with a tooth to be engageable with the parking gear, so that when the parking cam 115 slides on the inclined surface 114a formed on the sleeve 114 in response to the axial movement of the parking rod 112, the parking pawl 116 is pushed upwardly by the parking cam 115 in a direction perpendicular to the axial direction of the parking rod 112.

The parking pawl 116 thus pushed upwardly by the parking cam 115 causes the tooth formed on the parking pawl 116 to be engaged with the parking gear, so that the rotation shaft rotated together with the parking gear can be locked, thereby stopping the vehicle.

CITATION LIST

{Patent Literature}
{Patent Document 1}
Japanese Patent Application Publication No. 2003-276580

SUMMARY OF INVENTION

Technical Problem

The conventional parking lock mechanism as previously mentioned is constructed to have no lubrication means for positively lubricating the sliding surface of the parking cam 115 with respect to the parking pawl 116 and the sliding surface of the parking cam 115 with respect to the sleeve 114, thereby causing such a problem that the sliding resistance of the parking cam 115 increases.

For this reason, there has so far been proposed what is called a shift-by-wire control system in which the operation of a shift lever or a shift switch is electrically detected to operate an actuator for electrically changing the shift range and thereby to control the parking rod 112 through the detent lever 111. In this shift-by-wire control system, the parking rod 112 is to be driven by the actuator.

The parking lock mechanism to be operated by the shift-by-wire control system has an increased sliding resistance of the sliding portions of the parking cam 115 and the parking pawl 116 and the sliding portions of the parking cam 115 and sleeve 114, thereby resulting in increasing the torque amount of the actuator by the increased sliding resistance of the above sliding portions. This may possibly lead to making the actuator large in size and high in production cost.

Another parking locking mechanism to be operated by a wire system is constructed to transmit the operation of the shift lever to the detent lever 111 through a wire cable. The parking locking mechanism thus constructed is apt to need a large operation force by the driver.

The present invention has been made to overcome the conventional problems as previously mentioned, and has an object to provide a parking lock mechanism of a power transmission apparatus which can stably supply lubrication oil to the sliding surface of the parking cam to lessen the sliding resistance to the parking cam.

Solution to Problem

In order to attain the above object, the parking lock mechanism of the power transmission apparatus according to the present invention, (1) comprises a parking pawl engageable with and disengageable from a parking gear provided on a rotation member forming part of the power transmission apparatus, the rotation member being accommodated in a casing forming part of the power transmission apparatus, a parking rod axially movable in response to the operation of a shift lever to be operated by a driver, a parking cam fixedly mounted on the parking rod to be slidable together with the parking rod in response to the axial movement of the parking rod and to allow the parking pawl to be engaged with and disengaged from the parking gear, and a cylindrical member that slidably supports the parking cam, the cylindrical member being positioned with respect to the casing and supported on the casing, the parking lock mechanism further comprising a supply unit that supplies lubrication oil circulating in the casing to a sliding surface of the parking cam.

The parking lock mechanism of the power transmission apparatus is constructed to have the cylindrical member positioned with respect to the casing and supported on the casing, and to have a supply unit that supplies lubrication oil circulating in the casing to the sliding surface of the parking cam, so that the sliding surface of the parking cam, viz., the sliding surface between the parking pawl and the parking cam and the sliding surface between the parking cam and the cylindrical member can positively be lubricated by the lubrication oil. This results in the fact that the sliding resistance of the parking cam can be reduced to a level as small as possible. This makes it possible to suppress the parking cam, the parking pawl and the hollow members from being abraded.

Due to the fact that the sliding resistance of the parking cam can be reduced to a level as small as possible, the torque capacity of the actuator can be reduced, thereby making it possible to downsize the actuator as well as to reduce the cost of the actuator in the case that the parking lock mechanism is of a shift-by-wire type.

In the case that the parking lock mechanism is of a wire type, the sliding resistance of the parking cam can be made constant in addition to the fact that the operation force of the driver can be reduced, thereby making it possible to prevent the operation feeling from being deteriorated.

In the parking lock mechanism of the power transmission apparatus as set forth in the above item (1), (2) the supply unit is directly provided on the casing.

The parking lock mechanism of the power transmission apparatus is constructed to have the supply unit directly provided on the casing with the cylindrical member being positioned with respect to the casing and supported on the casing, so that the abutment position of the parking cam and the parking rod for locking the rotation member can properly be set.

In the parking lock mechanism of the power transmission apparatus as set forth in the above item (1), (3) the supply unit is provided on a support member fixed to the casing, the cylindrical member being positioned with respect to and supported on the casing through the support member.

The parking lock mechanism of the power transmission apparatus is constructed to have the supply unit provided on the support member with the cylindrical member being positioned with respect to the casing and supported on the casing, and to have the cylindrical member positioned with respect to the casing through the support member, so that the abutment position of the parking cam and the parking rod for locking the rotation member can properly be set.

In the parking lock mechanism of the power transmission apparatus as set forth in the above item (2), (4) the cylindrical member has an inner peripheral portion having an inclined surface that axially slidably supports the parking cam to allow the parking cam to run on the inclined surface in response to the axial movement of the parking rod, the cylindrical member having an upper portion formed with a notch that allows the parking pawl to move up and down, the supply unit being constructed to include a support portion provided on the casing to be held in abutment with an axial one end portion of the cylindrical member to position the cylindrical member with respect to the casing and to be supported on the casing, and a guide portion provided on the support portion to catch the lubrication oil circulating in the casing and to supply the lubrication oil to the support portion, the lubrication oil caught by the guide portion being supplied to the sliding surface of the parking cam through the support portion and the notch of the cylindrical member.

The parking lock mechanism of the power transmission apparatus is constructed to have a support portion that positions the cylindrical member with respect to the casing, and a guide portion that catches the lubricating oil circulating in the casing to supply the lubrication oil to the support portion, the cylindrical member having an upper portion formed with a notch for having the parking pawl abutted with the parking cam. The lubrication oil caught by the guide portion is supplied to the sliding surface of the parking cam, viz., the sliding surface between the parking pawl and the parking cam and the sliding surface between the parking cam and the cylindrical member through the support portion and the notch of the cylindrical member.

For this reason, the sliding surface of the parking pawl and the parking can and the sliding surface of the parking cam and the cylindrical member can positively be lubricated by the lubrication oil. This makes it possible to decrease the sliding resistance of the parking cam and thereby to suppress the sliding portions from being abraded.

In the parking lock mechanism of the power transmission apparatus as set forth in the above item (3), (5) the cylindrical member has an inner peripheral portion having an inclined surface that axially slidably supports the parking cam to allow the parking cam to run on the inclined surface in response to the axial movement of the parking rod, the cylindrical member having an upper portion formed with a notch that allows the parking pawl to move up and down, the supply unit being constructed to include a support portion provided on the support member to be held in abutment with an axial one end portion of the cylindrical member to position the cylindrical member with respect to the support member and to be supported on the support member, and a guide portion provided on the support portion to catch the lubrication oil circulating in the casing and to supply the lubrication oil to the support portion, the lubrication oil caught by the guide portion being supplied to the sliding surface of the parking cam through the support portion and the notch of the cylindrical member.

The parking lock mechanism of the power transmission apparatus is constructed to have a support portion that positions the cylindrical member with respect to the casing through the support member, and a guide portion that catches the lubrication oil circulating in the casing to supply the lubrication oil to the support portion, the cylindrical member having an upper portion formed with a notch for having the parking pawl abutted with the parking cam. The lubrication oil caught on the guide portion is supplied to the sliding surface of the parking cam, viz., the sliding surface between the parking pawl and the parking cam and the sliding surface between the parking cam and the cylindrical member through the support portion and the notch of the cylindrical member.

For this reason, the sliding surface between the parking pawl and the parking cam and the sliding surface between the parking cam and the cylindrical member can positively be lubricated by the lubrication oil. This makes it possible to decrease the sliding resistance of the parking cam and thereby to suppress the sliding portions from being abraded.

In the parking lock mechanism of the power transmission apparatus as set forth in the above item (2), (6) the cylindrical member is constituted by a first cylindrical member having a first inner peripheral portion having an inclined surface that axially slidably supports the parking cam to allow the parking cam to run on the inclined surface in response to the axial movement of the parking rod, the supply unit being constituted by a second cylindrical member constructed to be provided on the casing to be held in abutment with an axial one end portion of the first cylindrical member to position the first cylindrical member with respect to the casing and to be supported on the casing, the second cylindrical member having a second inner peripheral portion held in communication with the first inner peripheral portion of the first cylindrical member, and formed with an upper opening that introduces the lubrication oil circulating in the casing into the second peripheral portion.

The parking lock mechanism of the power transmission apparatus is constructed to have a second cylindrical member provided on the casing to be in abutment with the axial one end portion of the first cylindrical member to position the first cylindrical member with respect to the casing and to be supported on the casing. The second cylindrical member has a second inner peripheral portion held in communication with the first inner peripheral portion of the first cylindrical member, and an upper opening that introduces the lubricating oil circulating in the casing into the second inner peripheral portion, so that the lubrication oil introduced into the second inner peripheral portion through the upper opening can be supplied to the first inner peripheral portion of the first cylindrical member from the second inner peripheral portion of the second cylindrical member.

The lubrication oil supplied to the first inner peripheral portion is supplied to the sliding surface of the parking cam, viz., the sliding surface between the parking pawl and the parking cam and the sliding surface between the parking cam and the first cylindrical member, so that the sliding surface of the parking cam can positively be lubricated by the lubrication oil. This results in the fact that the sliding resistance of the parking cam can be reduced to a level as small as possible. This makes it possible to suppress the sliding portions from being abraded.

In the parking lock mechanism of the power transmission apparatus as set forth in the above item (3), (7) the cylindrical member is constituted by a first cylindrical member having a first inner surface portion having an inclined surface that axially slidably supports the parking cam to allow the parking cam to run on the inclined surface in response to the axial movement of the parking rod, the supply unit being constituted by a second cylindrical member provided on the support member to be held in abutment with an axial one end portion of the first cylindrical member to position the first cylindrical member with respect to the casing through the support member and to be supported on the casing, the second cylindrical member having a second inner peripheral portion held in communication with the first inner peripheral portion of the first cylindrical member, and formed with an upper opening that introduces the lubrication oil circulating in the casing into the second peripheral portion.

The parking lock mechanism of the power transmission apparatus is constructed to have a second cylindrical member provided on the support member to be in abutment with the axial one end portion of the first cylindrical member to position the first cylindrical member with respect to the casing through the support member and to be supported on the casing. The second cylindrical member has a second inner peripheral portion held in communication with the first inner peripheral portion of the first cylindrical member, and an upper opening that introduces the lubricating oil circulating in the casing into the second inner peripheral portion, so that the lubrication oil introduced into the second inner peripheral portion through the upper opening can be supplied to the first inner peripheral portion of the first cylindrical member from the second inner peripheral portion of the second cylindrical member.

The lubrication oil supplied to the first inner peripheral portion is supplied to the sliding surface of the parking cam, viz., the sliding surface between the parking pawl and the parking cam and the sliding surface between the parking cam and the first cylindrical member, so that the sliding surface of the parking cam can positively be lubricated by the lubrication oil. This results in the fact that the sliding resistance of the sliding portions of the parking pawl and the parking cam can be reduced to a level as small as possible. This makes it possible to suppress the sliding portions from being abraded.

In the parking lock mechanism of the power transmission apparatus as set forth in the above item (6) or (7), (8) the second cylindrical member has a discharge opening that discharges the lubrication oil introduced into the second cylindrical member.

The parking lock mechanism of the power transmission apparatus is constructed to have a discharge opening that discharges the lubrication oil introduced into the second cylindrical member, so that a predetermined amount of lubrication oil can be prevented from being accumulated in the first inner peripheral portion of the first cylindrical member, thereby preventing the frictional resistance of the parking cam from being reduced to an unnecessarily small level. For example, in the case that there is provided a spring for preventing the parking cam from being disengaged from the parking pawl at the time of performing the parking lock operation, the parking lock mechanism can make it unnecessary to increase the spring constant of the spring, thereby making it possible to prevent the parking lock mechanism from being made large in size.

In the parking lock mechanism of the power transmission apparatus as set forth in the above item (1), (9) the casing has a partition wall that rotatably supports an axial one end portion of a rotation shaft through a bearing, the cylindrical member being constituted by a first cylindrical member having a first inner peripheral portion having an inclined surface that axially slidably supports the parking cam to allow the parking cam to run on the inclined surface in response to the axial movement of the parking rod, the partition wall being formed with an introduction bore, and having one side surface formed with a support portion that supports the rotation shaft through the bearing across the introduction bore and the other side surface formed with the second cylindrical member, the second cylindrical member having an axial one end portion and an axial other end portion, the axial one end portion being formed on the partition wall to have the second inner peripheral portion held in communication with the introduction bore, and the axial other end portion projecting from the axial one end portion toward the first cylindrical member and being abutted with the axial one end portion of the first cylindrical member to have the second inner peripheral portion held in communication with the first inner peripheral portion, the second cylindrical member constituting the supply unit that supplies the lubrication oil introduced into the second inner peripheral portion through the upper opening to the bearing through the introduction bore.

The parking lock mechanism of the power transmission apparatus is constructed to have a second cylindrical member having an axial one end portion and an axial other end portion, the axial one end portion being formed on the partition wall to have the second inner peripheral portion held in communication with the introduction bore, and the axial other end portion projecting from the axial one end portion toward the first cylindrical member and abutted with the axial one end portion of the first cylindrical member to have the second inner peripheral portion held in communication with the first inner peripheral portion, so that the lubrication oil introduced into the second inner peripheral portion through the upper opening is supplied to the bearing through the introduction bore. Therefore, the parking lock mechanism thus constructed can lubricate not only the sliding surface of the parking cam but also the bearing by taking advantage of the single second cylindrical member.

As a consequence, the parking lock mechanism can make it unnecessary to assemble an exclusive constitutional element for lubricating only the bearing in the casing, thereby making it possible to simplify the construction of the casing. Moreover, the parking lock mechanism can lighten the power transmission apparatus and reduce the production cost of the power transmission apparatus.

In the parking lock mechanism of the power transmission apparatus as set forth in the above item (1), (10) the casing has a partition wall defining in the casing an accommodation chamber that accommodates a rotation motor therein and having one side surface facing the rotation motor and the other side surface facing the cylindrical member, the cylindrical member being constituted by a first cylindrical member having a first inner peripheral portion having an inclined surface that axially slidably supports the parking cam to allow the parking cam to run on the inclined surface in response to the axial movement of the parking rod, the partition wall being formed with an introduction bore, and provided with a second cylindrical member projecting from the introduction bore toward the first cylindrical member to be abutted with an axial one end portion of the first cylindrical member and having a second inner peripheral portion held in communication with the first inner peripheral portion of the first cylindrical member, the partition wall constituting the supply unit that supplies the lubrication oil having cooled the rotation motor to the sliding surface of the parking cam from the introduction bore through the first inner peripheral portion and the second inner peripheral portion.

The parking lock mechanism of the power transmission apparatus is constructed to have a partition wall being formed with an introduction bore, and provided with a second cylindrical member projecting from the introduction bore toward the first cylindrical member to be abutted with the axial one end portion of the first cylindrical member and having a second inner peripheral portion held in communication with the first inner peripheral portion of the first cylindrical member, so that the lubrication oil having cooled the rotation motor is supplied to the sliding surface of the parking cam from the introduction bore through the first inner peripheral portion and the second inner peripheral portion, thereby making it possible to decrease the sliding resistance of the parking cam. The parking lock mechanism thus constructed can suppress the sliding surface between the parking cam and the parking pawl and the sliding surface between the parking cam and the first cylindrical member from being abraded.

Due to the fact that the parking lock mechanism can take advantage of the introduction bore for discharging the lubrication oil to cool the rotation motor to lubricate the sliding surfaces of the parking cam with the lubrication oil passing through the introduction bore, the parking lock mechanism can make it unnecessary to assemble an exclusive bore for lubricating only the parking cam, thereby making it possible to reduce hourly labor units needed for forming the introduction bore, and thereby to reduce the production cost of the casing.

Advantageous Effects of Invention

The present invention can provide a parking lock mechanism of a power transmission apparatus which can stably supply the lubrication oil to the sliding surface of the parking cam, thereby making it possible to decrease the sliding resistance of the parking cam.

DESCRIPTION OF EMBODIMENTS

The preferred embodiments of the parking lock mechanism of the power transmission apparatus according to the present invention will be described hereinafter with reference to the accompanying drawings.

First Embodiment

FIGS. 1 to 6 are views showing a first embodiment of the parking lock mechanism of the power transmission apparatus according to the present invention. The present embodiment is shown in these views as an example in which the parking lock mechanism is applied to a hybrid vehicle.

The construction of the first embodiment of the parking lock mechanism will firstly be explained hereinafter.

Figure 1:
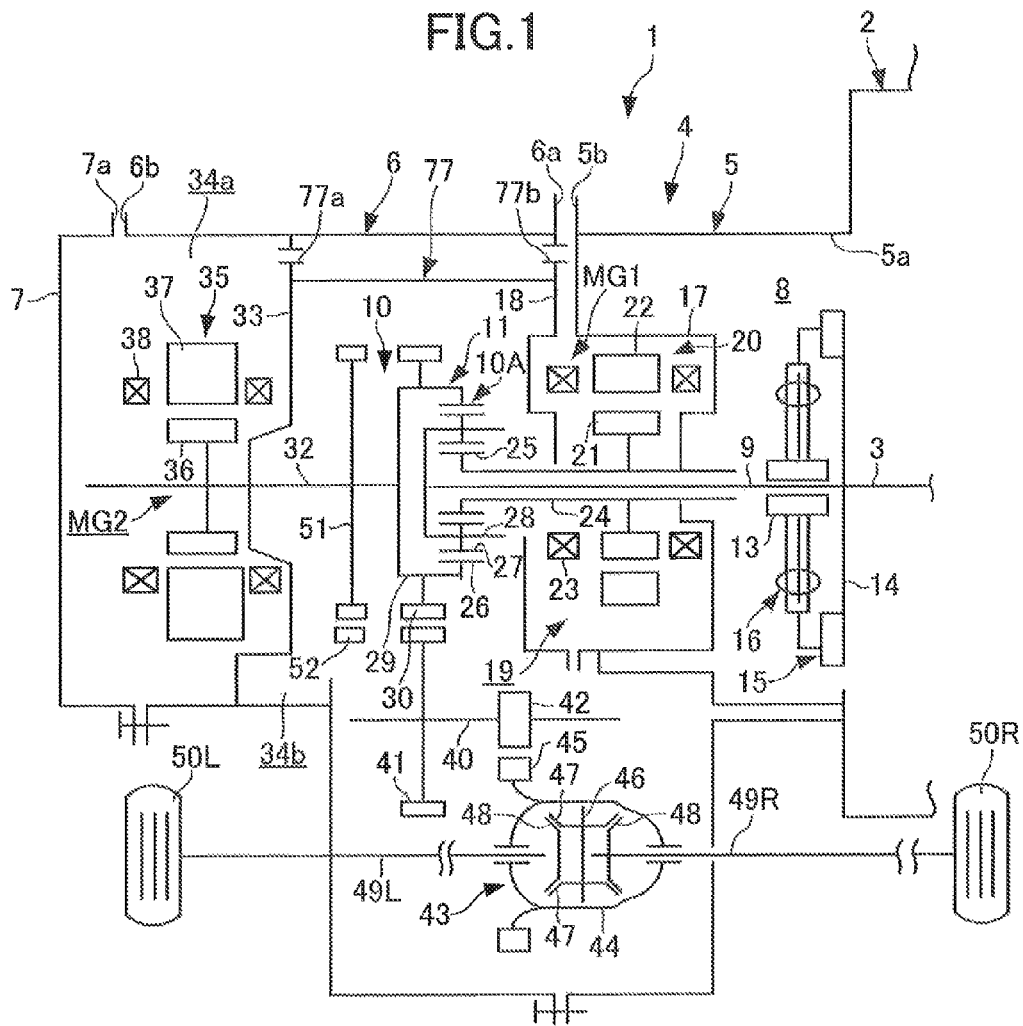
FIG. 1 is a view showing a first embodiment of a parking lock mechanism of a power transmission apparatus according to the present invention, and is a schematic construction view of a transaxle forming part of a hybrid vehicle.

In FIG. 1, there is shown a transaxle 1 functioning as a power transmission apparatus of a hybrid vehicle which is of a type of "FF" (front-engine-front-drive layout; front-installed engine front-wheel drive). The transaxle 1 is operatively connected with an engine 2.

The engine 2 is constituted by an internal combustion engine such as a gasoline engine, a diesel engine, an LPG engine, a methanol engine, or a hydrogen engine. The present embodiment win be explained hereinafter using a gasoline engine as the engine 2 for convenience.

The engine 2 is well known in the art to output a driving force from a crankshaft 3 with the fuel burned, and thus provided with an intake device, an exhaust device, a fuel injection device, an ignition device, and a cooling device. The crankshaft 3 is arranged horizontally in the width direction of the vehicle, and has a rear end portion formed with a flywheel 14.

The engine 2 has an outer wall portion having a hollow transaxle case 4 fixedly mounted thereon. The transaxle case 4 has an engine side housing 5, an extension housing 6, and an end cover 7. The engine side housing 5, the extension housing 6, and the end cover 7 are made of a metal material such as aluminum shaped and worked. The engine 2 is secured to the engine side housing 5 with the one opening end 5a of the engine side housing 5 being held in contact with the engine 2.

Between the engine side housing 5 and the engine cover 7 is disposed the extension housing 6 which is secured to the engine side housing 5 with the other opening end 5b of the engine side housing 5 being held in contact with the one opening end 6a of the extension housing 6.

The opening end 7a of the end cover 7 is provided to close the other opening end 6b of the extension housing 6, so that the end cover 7 and the extension housing 6 are secured to each other.

The transaxle case 4 has an inner hollow space 8 in which are provided an input shaft 9, a motor generator MG1, a power distribution mechanism 10, a transmission mechanism 11 including a plurality of planetary gear sets, and a motor generator MG2.

The input shaft 9 is disposed in coaxial relationship with the crankshaft 3, and has an end portion close to the crankshaft 3 and splined to a clutch hub 13.

The transaxle case 4 accommodates therein a clutch 15 which is adapted to control the power transmission state between the flywheel 14 and the input shaft 9. The clutch 15 has a damper mechanism 16 capable of suppressing and absorbing the torque fluctuation between the flywheel 14 and the input shaft 9.

The motor generator MG1 is disposed at the outside of the input shaft 9, while the motor generator MG2 is arranged at a position remoter than the motor generator MG1 from the engine 2.

In other words, the motor generator MG1 is positioned between the engine 2 and the motor generator MG2. The motor generators MG1 and MG2 have two functions including one function (motor function) as an electric motor to be driven with a supply of an electric power, and another function (regeneration function) as a generator to convert mechanical energy to electric energy.

The motor generators MG1 and MG2 may be constituted for example by an alternating current synchronous type of motor generator. The electric power supply unit for supplying the electric power to the motor generators MG1 and MG2 may be constituted by an electricity accumulation device such as a battery, a capacitor and the like or otherwise a fuel cell well known in the art.

The engine side housing 5 has an inner space in which is formed a partition wall 17 extending toward the engine 2 and then toward the input shaft 9, and secured to the case cover 18.

The case cover 18 has a shape extending away from the engine 2 and then toward the input shaft 9. The partition wall 17 and the case cover 18 collectively surround and form a motor accommodation chamber 19 allowing the motor generator MG1 to be disposed therein. The motor generator MG1 is provided with a stator 20 secured to the transaxle case 4, and a rotor 21 rotatable with respect to the stator 20. The stator 20 has an iron core 22 secured to the partition wall 17, and a coil wound around the iron core 22.

The stator 20 and the rotor 21 are each constituted by a plurality of electromagnetic steel plates each having a predetermined thickness and stacked with each other in the thickness direction thereof. The magnetic steel plates are stacked in the axial direction of the input shaft 9.

The input shaft 9 has an outer peripheral portion on which a hollow shaft 24 is mounted to allow the input shaft 9 and the hollow shaft 24 to relatively be rotatable with each other. The rotor 21 is connected with the outer peripheral portion of the hollow shaft 24.

The power distribution mechanism 10 is disposed between the motor generator MG1 and motor generator MG2. The power distribution mechanism 10 has a planetary gear mechanism 10A which is of a single pinion type. This means that the planetary gear mechanism 10A is constituted by a sun gear 25, a ring gear 26 disposed in coaxial relationship with the sun gear 25, and a carrier 28 retaining pinion gears 27 held in meshing, engagement with the sun gear 25 and the ring gear 26.

The sun gear 25 and the hollow shaft 24 are connected with each other, while the carrier 28 and the input shaft 9 are connected with each other. The ring gear 26 is formed on the inner peripheral wall portion of a cylindrical member 29 disposed in coaxial relationship with the input shaft 9. On the outer peripheral wall portion of the cylindrical member 29 is formed a counter drive gear 30.

The motor generator MG2 is positioned at a place remoter than the counter drive gear 30 from the engine 2. The motor generator MG2 has a rotor 36 connected with the outer peripheral portion of a MG shaft 32 which is in turn horizontally disposed in the width direction of the vehicle.

The MG shaft 32 is held in axial alignment with the input shaft 9 which is in turn held in coaxial relationship with the hollow shaft 24.

The extension housing 6 has an inner surface from which a partition wall 33 extends to the MG shaft 32. The extension housing 6, the partition wall 33 and the end cover 7 surround to collectively form a motor accommodation chamber 34a in which the motor generator MG2 is disposed.

The motor generator MG2 is provided with a stator 35 secured to the transaxle case 4, and a rotor 36 rotatable with respect to the stator 35. The stator 35 has an iron core 37, and a coil 38 wound around the iron core 37.

The stator 35 and the rotor 36 are each constituted by a plurality of electromagnetic steel plates each having a predetermined thickness and stacked with each other in the thickness direction thereof. The magnetic steel plates are stacked in the axial direction of the MG shaft 32.

The MG shaft 32 has an axial one end portion connected with the ring gear 26, so that when the driving force of the motor generator MG2 is transmitted to the ring gear 26 through the MG shaft 32, the rotational speed of the ring gear 26 is reduced and transmitted to the cylindrical member 29. This means that the torque of the motor generator MG2 is amplified and transmitted to the power distribution mechanism 10.

The power distribution mechanism 10 is constructed to have the above carrier 28 connected with the crankshaft 3 of the engine 2, to have the sun gear 25 connected with the motor generator MG1, and to have the ring gear 26 connected with the motor generator MG2 through the MG shaft 32. When the motor generator MG1 serves as a generator, the driving force to be inputted through the carrier 28 from the engine 2 is distributed to the sun gear 25 and the ring gear 26 in response to the gear ratio of the sun gear 25 and the ring gear 26. When, on the other hand, the motor generator MG1 serves as a motor, the driving force to be inputted from the engine 2 through the carrier 28 and the driving force to be inputted from the motor generator MG1 through the sun gear 25 are integrated and outputted to the ring gear 26.

On the other hand, the transaxle case 4 houses therein a counter shaft 40 provided in parallel relationship with the input shaft 9. The counter shaft 40 has a counter driven gear 41 and a final drive gear 42 securely mounted thereon with the counter driven gear 41 being held in engagement with the counter drive gear 30.

Further, the transaxle case 4 houses therein a differential apparatus 43 which comprises a final ring gear 45 formed on the outer peripheral portion of the differential case 44, a plurality of pinion gears 47 connected with the differential case 44 through pinion shafts 46, side gears 48 held in engagement with the pinion gears 47, and two front drive shafts 49L, 49R connected with the side gears 48.

The front drive shafts 49L, 49R are connected with front wheels 50L, 50R, respectively. As will be understood from the foregoing description, the transmission mechanism 11 and the differential apparatus 43 housed in the transaxle case 4 constitute in combination a power transmission apparatus, i.e., a transaxle 1.

The MG shaft 32 has a parking gear 51 constituting a rotation member mounted thereon in axial alignment with the ring gear 26. The parking gear 51 is engageable with a parking pawl 62 forming part of a parking lock mechanism 52. The parking pawl 62 and the parking lock mechanism 52 become apparent as the description proceeds hereinafter.

Figure 2:
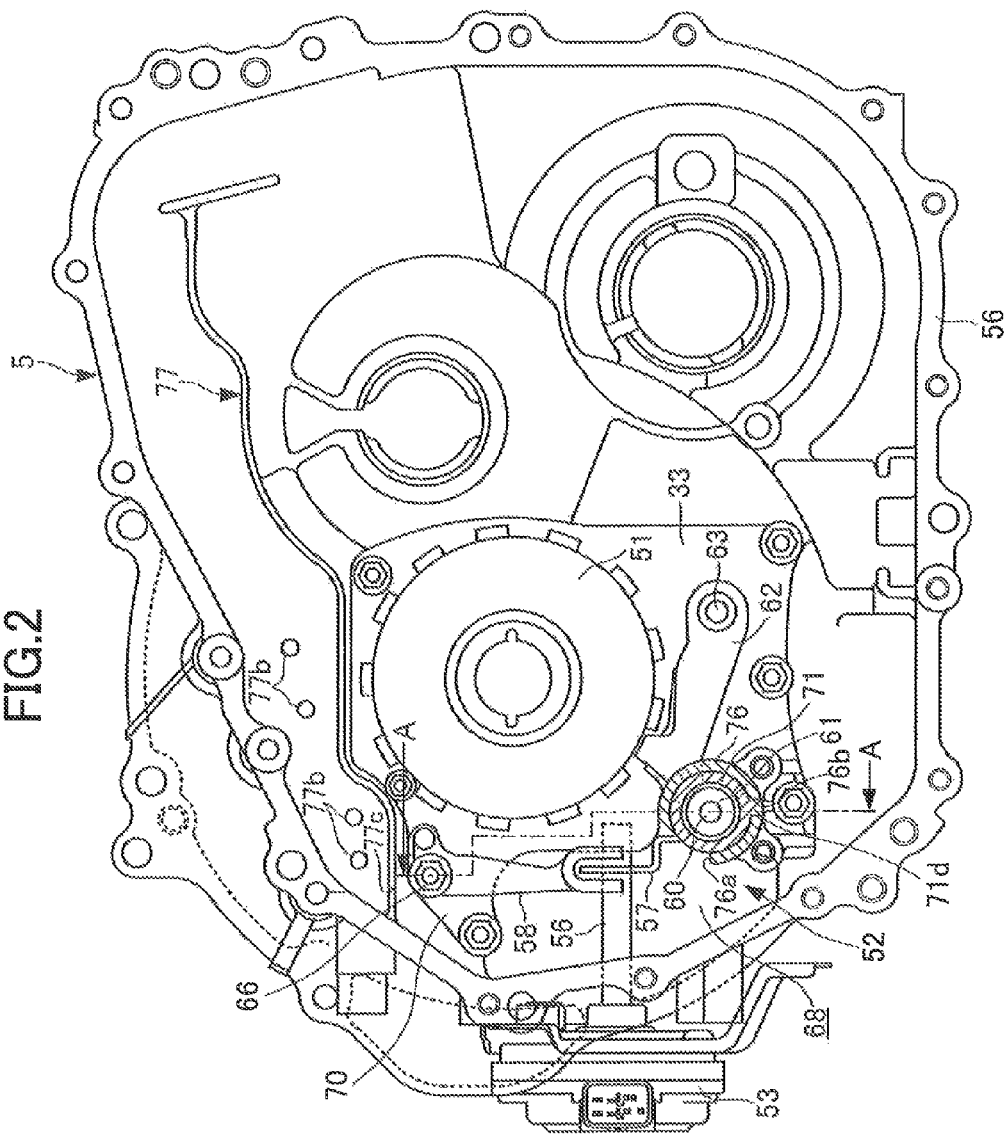
FIG. 2 is a view showing the first embodiment of the parking lock mechanism of the power transmission apparatus according to the present invention, and is a side view of an engine side housing seen from an extension housing.
Figure 3:
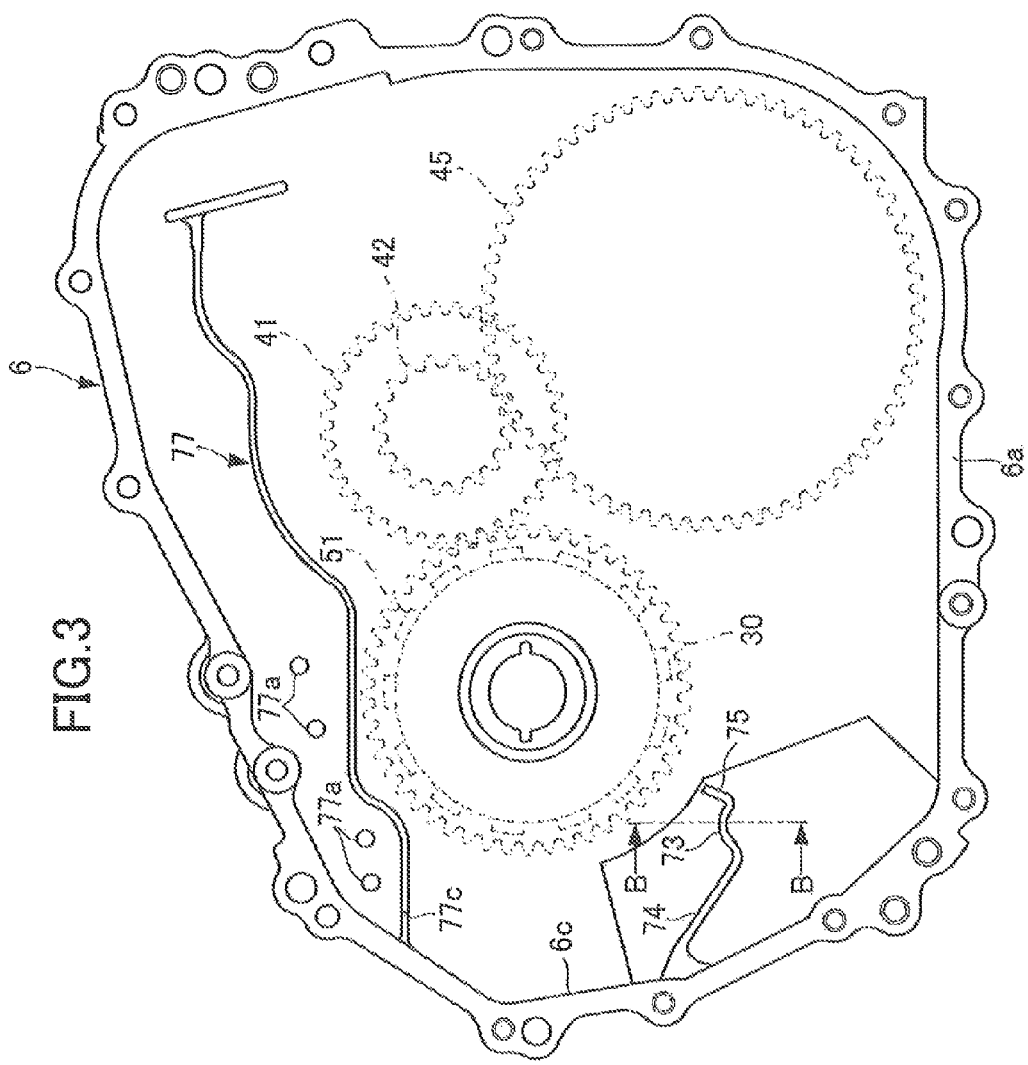
FIG. 3 is a view showing the first embodiment of the parking lock mechanism of the power transmission apparatus according to the present invention, and is a construction view of the extension housing seen from the engine side housing.

The transaxle case 4 is shown in FIGS. 2 and 3 as being divided, FIG. 2 showing a side view of the engine side housing 5 (constituting a casing defined in the present invention) while FIG. 3 showing a side view of the extension housing 6 (also constituting the casing defined in the present invention).

The engine side housing 5 is partly constituted by the partition wall 17 and the case cover 18, while the extension housing 6 is partly constituted by the end cover 7 and the partition wall 33. The counter drive gear 30, the counter driven gear 41, the final drive gear 42, and the final ring gear 45 are shown in phantom lines in FIG. 3.

Figure 4:
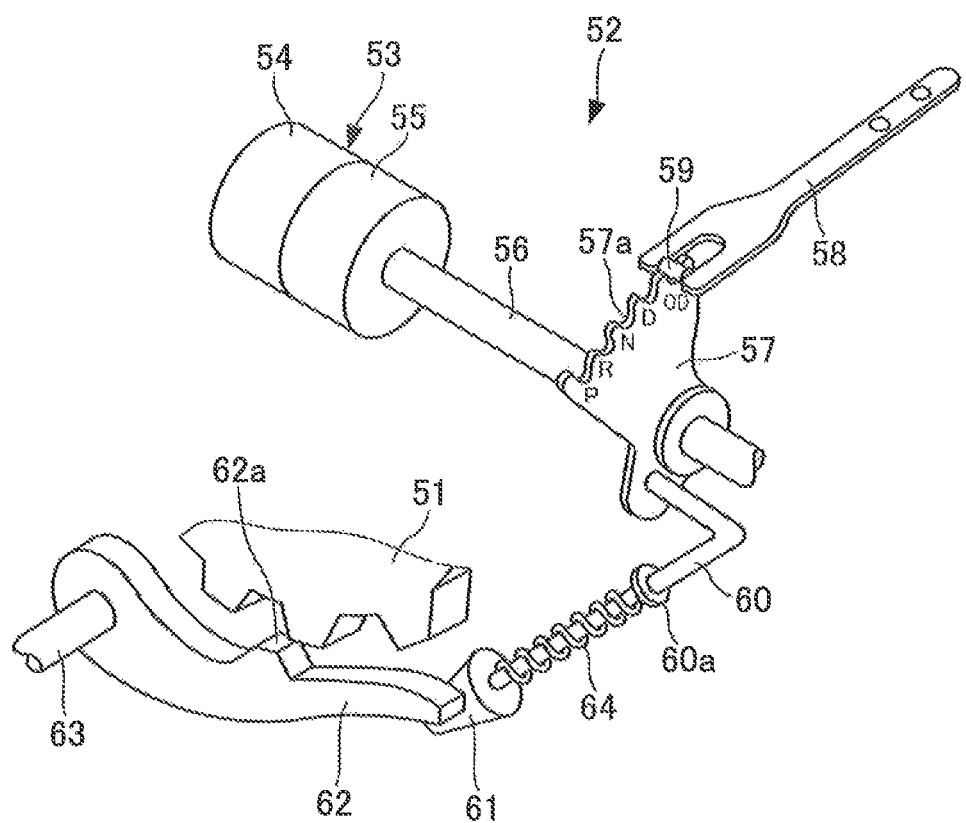
FIG. 4 is a view showing the first embodiment of the parking lock mechanism of the power transmission apparatus according to the present invention, and is a perspective view of the parking lock mechanism.

As shown in FIG. 2, the engine side housing 5 is provided with the parking lock mechanism 52. First, the overall configuration of the parking lock mechanism is described hereinafter with reference to FIG. 4. As shown in FIG. 4, the parking lock mechanism 52 is provided with an actuator 53 which in turn comprises a synchronous motor 54 such as a switched reluctance motor (SR motor) and the like, and a speed reduction mechanism 55 adapted to reduce the rotational speed for outputting the driving force.

The speed reduction mechanism 55 has an output shaft with which an output shaft 56 is connected. The output shaft 56 is connected with a detent lever 57.

The detent lever 57 is connected with a spool valve forming part of a manual valve not shown, so that the detent lever 57 is pivoted together with the output shaft 56 by the motor 54 to have the operation amount of the manual valve (position of the spool valve) changed, thereby changing the range of the automatic transmission to any one of the P (parking) range, the R (reverse) range, the N (neutral) range, the D (drive) range, and the OD (over drive) range.

The motor 54 is driven to allow the shift range to take a shift range position corresponding to the indicated shift range selected by the shift lever operated by the driver, thereby pivoting the detect lever 57 through the output shaft 56, so that the spool valve of the manual valve can be changed to a position corresponding to each of the P range, the R range, the N range, the D range, and the OD range.

The detent lever 57 is formed with five concave portions 57a each serving to retain the spool valve of the manual valve at the position corresponding to each of the P range, the R range, the N range, the D range, and the OD range.

Above the detent lever 57 is disposed a detent spring 58 which has a tip end portion having a roller 59 rotatably mounted thereon. The roller 59 is resiliently urged against the detent lever 57 by the detent spring 58, so that the roller 59 is engaged with the concave portion 57a corresponding to the targeted shift range to have the detent lever 57 retain the pivot angle of the targeted shift range, thereby retaining the position of the spool valve of the manual valve at the targeted shift range.

On the other hand, to the detent lever 57 is secured an L-shaped parking rod 60 which has a tip end portion having a tapered cone-shaped parking cam 61 securely mounted thereon. A parking pawl 62 is in contact with an outer peripheral surface (cam surface) of the parking cam 61.

The parking pawl 62 is pivoted around the center axis of a pivot shaft 63 and thus moved upwardly and downwardly in response to the position of the parking cam 61 moving along with the axial movement of the parking rod 60. The upward and downward movement of the parking pawl 62 causes the lock pawl 62a of the parking pawl 62 to be engaged with the parking gear 51 or disengaged from the parking gear 51, thereby making it possible for the rotation of the parking gear 51 to be locked or released from being locked.

The parking rod 60 has a stop member 60a securely mounted thereon, and a spring 64 supported thereon between the stop member 60a and the parking cam 61 to urge the parking cam 61 toward the parking pawl 62. This means that the parking cam 61 is slidable along the parking rod 60.

The parking lock mechanism 52 can therefore lock the parking gear 51 securely mounted on the MG shaft 32 with the parking pawl 62 to prevent the front wheels SQL, 50R of the hybrid vehicle from being rotated, thereby retaining the hybrid vehicle in the parking state.

The actuator 53, the output shaft 56, the detent lever 57, the detent spring 58, the parking rod 60, the parking cam 61, the parking pawl 62, and the spring 64 as previously mentioned in the present embodiment constitute as a whole the parking lock mechanism 52.

Next, the positional relationship between the parking lock mechanism 52 and the engine side housing 5, and the positional relationship between the parking lock mechanism 52 and the extension housing 6 will be explained hereinafter with reference to FIGS. 2, 3, 5, and 6.

Figure 5:
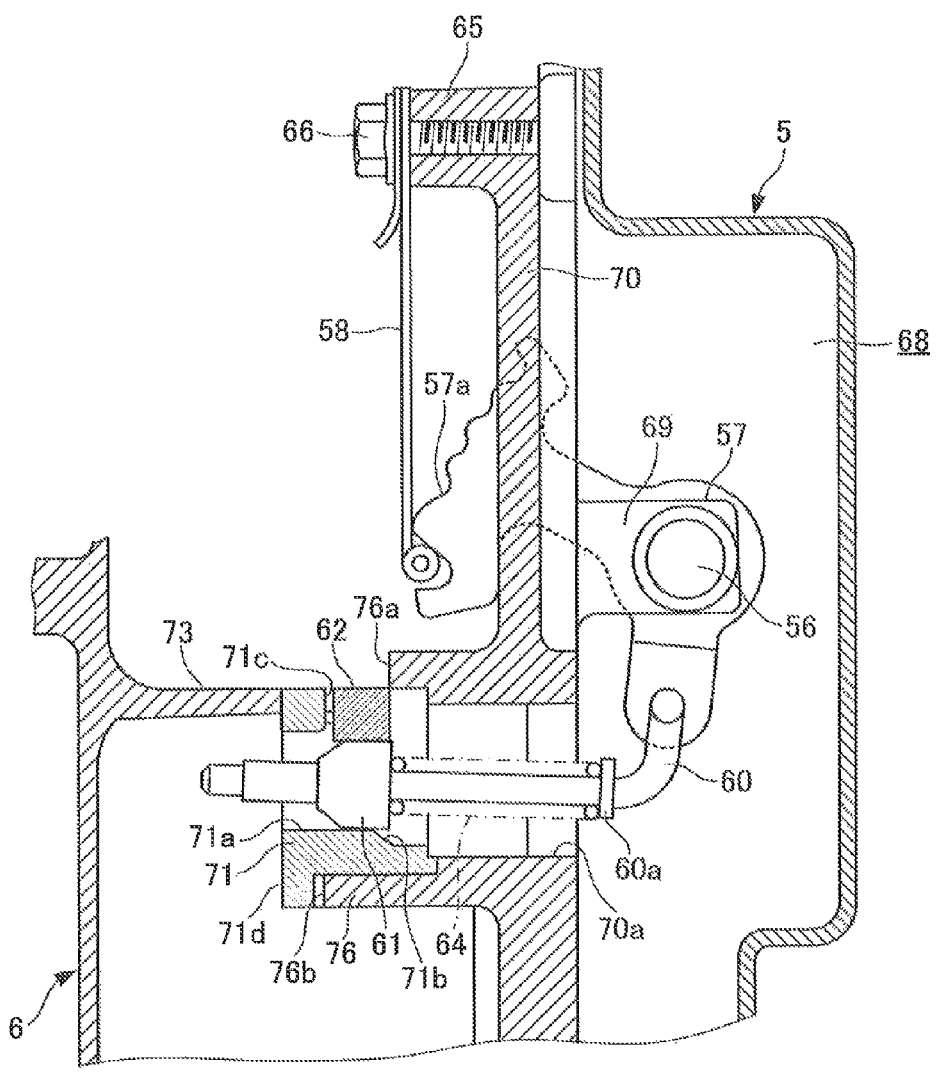
FIG. 5 is a view showing the first embodiment of the parking lock mechanism of the power transmission apparatus according to the present invention, and is a cross-sectional view of the parking lock mechanism taken and seen from the line A-A in FIG. 2 in a parking lock state and corresponding to a cross-sectional view of the parking lock mechanism taken and seen from the line B-B in FIG. 3.
Figure 6:
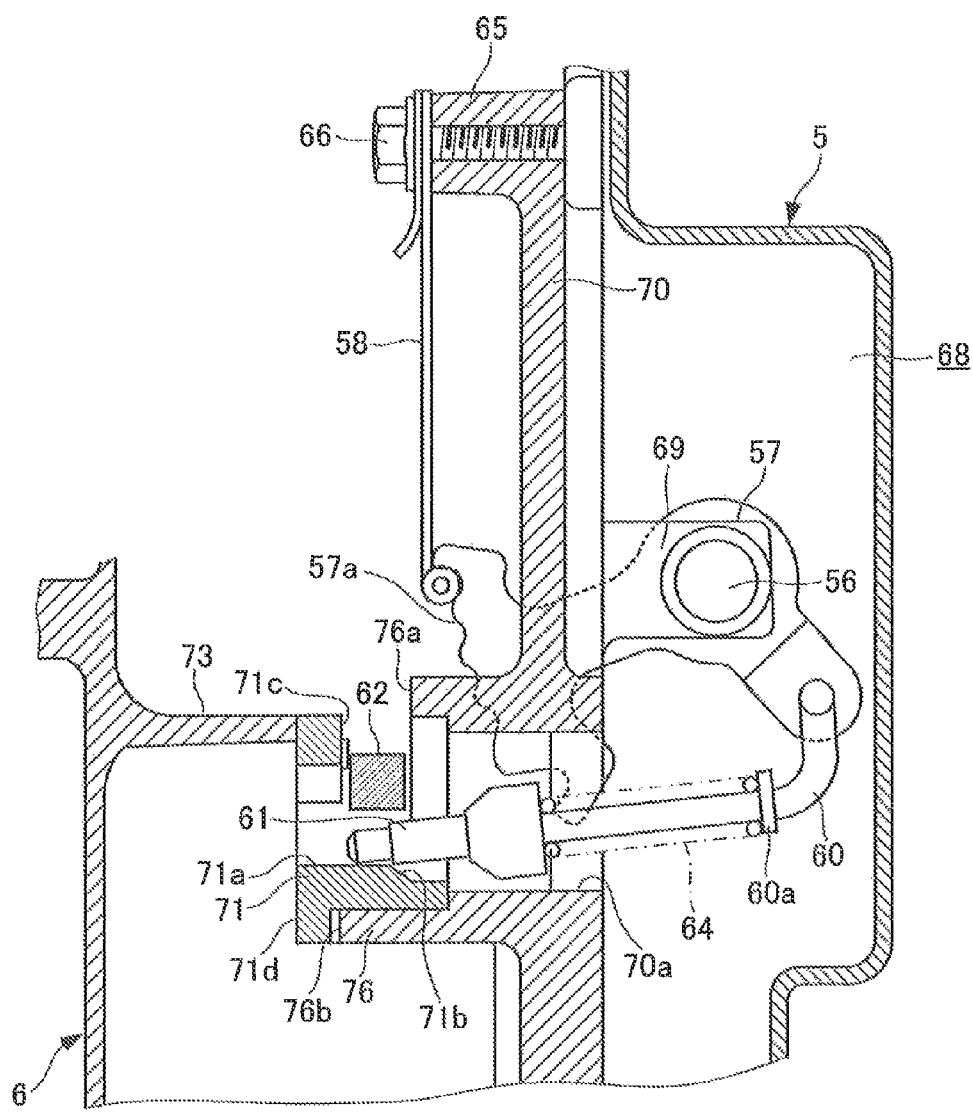
FIG. 6 is a view showing the first embodiment of the parking lock mechanism of the power transmission apparatus according to the present invention, and is a cross-sectional view of the parking lock mechanism taken and seen from the line A-A in FIG. 2 in a parking lock released state and corresponding to a cross-sectional view of the parking lock mechanism taken and seen from the line BB in FIG. 3.

The actuator 53 is shown in FIG. 2 to be secured to the engine side housing 5. As shown in FIGS. 2, 5 and 6, the detent spring 58 has an end portion secured by a bolt 66 to a cylindrical portion 65 formed on a parking cover 70 provided on the engine side housing 5.

The parking cover 70 is not held in face-to-face relationship with the motor accommodation chamber 19, and defines together with the engine side housing 5 an accommodation chamber 68 accommodating therein the parking lock mechanism 52. The accommodation chamber 68 is held in communication with an inner space 34b which will be described hereinafter.

As shown in FIGS. 5 and 6, the parking cover 70 has a rear portion formed with a support bracket 69 rotatably supporting the output shaft 56. As shown in FIGS. 2, 5 and 6, the parking cover 70 is formed with a retaining portion 76 projecting toward the extension housing 6 from the parking cover 70.

The retaining portion 76 has an upper portion partly formed with a notch 76a through which a sleeve 71 is received to be securely mounted on the retaining portion 76. The sleeve 71 constitutes a cylindrical member and a first cylindrical member as defined in the present invention.

The sleeve 71 is therefore retained by the retaining portion 76. The sleeve 71 has an inner peripheral portion 71a serving as a first inner peripheral portion in which the parking cam 61 is received. The sleeve 71 axially slidably supports the parking cam 61. The parking cover 70 is formed with a through bore 70a through which the parking rod 60 and the parking cam 61 extend to be received in the inner peripheral portion of the retaining portion 76 and the inner peripheral portion 71a of the sleeve 71.

The inner peripheral portion 71a of the sleeve 71 is formed with an inclined surface 71b allowing the parking cam 61 to be contacted thereon and move thereover in response to the axial movement of the parking rod 60. The sleeve 71 has an upper portion formed with a notch 71c allowing the parking pawl 62 to move up and down.

As shown in FIG. 3, the extension housing 6 is formed with a support portion 73 projecting toward the engine side housing 5 from its surface opposing to the engine side housing 5. The support portion 73 is in face-to-face relationship with the parking cover 70 with a predetermined gap defined between the support portion 73 and the parking cover 70.

The support portion 73 is held in abutment with the axial end portion of the sleeve 71, so that the sleeve 71 is positioned by the support portion 73 at the engine side housing 5 and the extension housing 6, and supported by the engine side housing 5 and the extension housing 6.

The support portion 73 is integrally formed with a first guide rib 74 serving as a guide portion. The first guide rib 74 extends from the support portion 73 toward the side wall 6c of the extension housing 6 and is connected with the side wall 6e. The support portion 73 has an end portion opposing to the first guide rib 74 and formed with a second guide rib 75 upwardly projecting from the retaining portion 76. The support portion 73 and the first guide rib 74 described in the present embodiment constitute in combination a supply unit.

The sleeve 71 has an axial one end portion formed with a stopper portion 71d downwardly extending to be fittingly engaged with a notch 76b formed in the axial one portion of the retaining portion 76. This means that the sleeve 71 is prevented from being rotated with respect to the retaining portion 76 by the stopper portion 71d.

On the other hand, due to the fact that the inner peripheral portion of the sleeve 71 is formed with the inclined surface 71b allowing the parking cam 61 to be contacted thereon and move thereover in response to the axial movement of the parking rod 60 toward the support portion 73, the parking pawl 62 is upwardly moved by the parking cam 61 when the parking cam 61 moves over the inclined surface 71b. As a consequence, the lock pawl 62a of the parking pawl 62 is brought into engagement with the parking gear 51 to lock the parking gear 51 (see FIG. 5).

In addition, the parking cam 61 slides down the inclined surface 71b in response to the axial movement of the parking rod 60 away from the support portion 73. At this time, the parking pawl 62 is downwardly moved by the parking cam 61, thereby moving the lock pawl 62a of the parking pawl 62 away from the parking gear 51 to release the locked state of the parking gear 51 (see FIG. 6).

For this reason, one axial end portion of the sleeve 71 is held in abutment with the support portion 73 to position the sleeve 71 with respect to the extension housing 6, thereby making it possible to set the abutment positions of the parking cam 61 and parking rod 60 for locking the parking gear 51.

As shown in FIGS. 1 to 3, the engine side housing 5 and the extension housing 6 has a common upper portion formed with a catch tank 77. The catch tank 77 is formed with oil introduction openings 77a, 77b allowing oil to be introduced into the motor accommodation chamber 19, 34a and to cool the stators 20, 35 of the motor generators MG1, MG2, and an oil discharge opening 77c allowing the oil to be dropped into the inner space 34b accommodating therein the counter drive gear 30, the counter driven gear 41, the final drive gear 42, and the final ring gear 45.

The transaxle case 4 has a bottom portion allowing the oil to be stored therein. The oil stored in the bottom portion of the transaxle case 4 is scooped up by the final ring gear 45 to be supplied to the catch tank 77. The oil supplied to the catch tank 77 is introduced into the motor accommodation chambers 34a, 19 through the oil introduction openings 77a, 77b, and dropped into the inner space 34b.

The oil dropped into the inner space 34b is adapted to be caught by the first guide rib 74. The oil caught by the first guide rib 74 is collected into the support portion 73, and then supplied into the sleeve 71 from the support portion 73 through the notch 71c of the sleeve 71.

For performing the parking lock in the transaxle 1 of the present embodiment, the motor 54 is driven to rotate the output shaft 56, thereby pivoting the detent lever 57. In response to the pivotal movement of the detent lever 57, the parking rod 60 is axially moved toward the support portion 73, so that the parking cam 61 slides on and moves over the inclined surface 71b of the sleeve 71.

At this time, the parking pawl 62 is pushed up by the parking cam 61, viz., the parking pawl 62 is moved upward around the pivot shaft 63 as a fulcrum, so that the lock pawl 62a of the parking pawl 62 is brought into engagement with the parking gear 51, thereby locking the parking gear 51.

On the other hand, the oil scooped up to the catch tank 77 by the final ring gear 45 is then introduced into the motor accommodation chambers 19, 34a through the oil introduction openings 77a, 77b of the catch tank 77 to cool the stators 20, 35 of the motor generators MG1, MG2.

Further, the oil scooped up by the final ring gear 45 is supplied to the meshing portions of the final gear 45 with the counter driven gear 41, and the meshing portions of the final drive gear 42 with the counter drive gear 30, so that the above meshing portions can fully be lubricated.

Further, the oil scooped up to the catch tank 77 by the final ring gear 45 is then dropped into the inner space 34b through the oil discharge opening 77c. The oil thus dropped is caught by the first guide rib 74, and then flows down along the first guide rib 74 to be collected on the support portion 73.

Due to the second guide rib 75 formed on the support portion 73, the oil collected on the support portion 73 is prevented from being moved toward the second guide rib 75, and supplied into the inner peripheral portion 71a of the sleeve 71 through the notch 71c of the sleeve 71 from the support portion 73.

For this reason, the oil passing through the notch 71c of the sleeve 71 is supplied to the sliding surface between the parking cam 61 and the parking pawl 62, while the oil introduced into the inner peripheral portion 71a of the sleeve 71 is supplied to the sliding surface between the parking cam 61 and the sleeve 71.

As has been described in the above, the parking lock mechanism 52 according to the present embodiment is constructed to have a first guide rib 74 provided on the support portion 73 serving to position the sleeve 71 with respect to the extension housing 6 to catch the oil circulating in the transaxle case 4, and to form a notch 71c at the upper portion of the sleeve 71 to bring the parking pawl 62 into abutment with the parking cam 61, so that the oil caught on the first guide rib 74 can be supplied to the sliding surface of the parking cam 61, viz., the sliding surface between the parking pawl 62 and the parking cam 61 and the sliding surface between the parking cam 61 and the sleeve 71.

As a consequence, the sliding surface between the parking pawl 62 and the parking cam 61 and the sliding surface between the parking cam 61 and the sleeve 71 can positively be lubricated by the oil, thereby making it possible to decrease the sliding resistance of the parking cam 61. The sliding surface between the parking pawl 62 and the parking cam 61 and the sliding surface between the parking cam 61 and the sleeve 71 can therefore be suppressed from being worn down.

Due to the fact that the sliding resistance of the parking cam 61 can be lessened, it is possible to reduce the torque amount of the motor 54 of the actuator 53, thereby making it possible to downsize the actuator 53 and to lower the production cost of the actuator 53.

In the present embodiment, the axial one end portion of the sleeve 71 has a lower portion formed with as stopper portion 71.d downwardly extending to be fittingly engaged with a notch 76b formed in the axial one portion of the retaining portion 76, so that the sleeve 71 is prevented from being rotated with respect to the retaining portion 76 by the stopper portion 71d. The stopper portion 71d thus formed is simple in construction and can prevent the sleeve 71 from being rotated, thereby making it possible to simplify the construction of the parking lock mechanism 52. In the present embodiment, the sleeve 71 is positioned with respect to the engine side housing 5 and the extension housing 6 by the support portion 73, and supported on the engine side housing 5 and the extension housing 6, thereby making it possible to set the abutment position of the parking cam 61 and the parking rod 60 for locking the parking gear 51.

While the present embodiment has been explained with the support portion 73 formed with the first guide rib 74, the present invention is not limited to this construction. According to the present invention, the support portion 73 may have an upper portion formed with a groove extending in the same direction as the axial direction of the sleeve 71 to supply the oil dropped on the support portion 73 to the sleeve 71 through the groove.

The present embodiment is constructed to have the support portion 73, the first guide rib 74, and the second guide rib 75 integrally with the extension housing 6, viz., directly provided on the extension housing 6, however, the extension housing 6 may be provided with a guide plate serving as a support member on which the support portion 73, the first guide rib 74 and the second guide rib 75 are provided according to the present invention.

In the construction previously mentioned, the sleeve 71 comes to be positioned with respect to the engine side housing 5 and the extension housing 6 through the support portion 73 and the guide plate, and to be supported on the engine side housing 5 and the extension housing 6.

Second Embodiment

Figure 7:
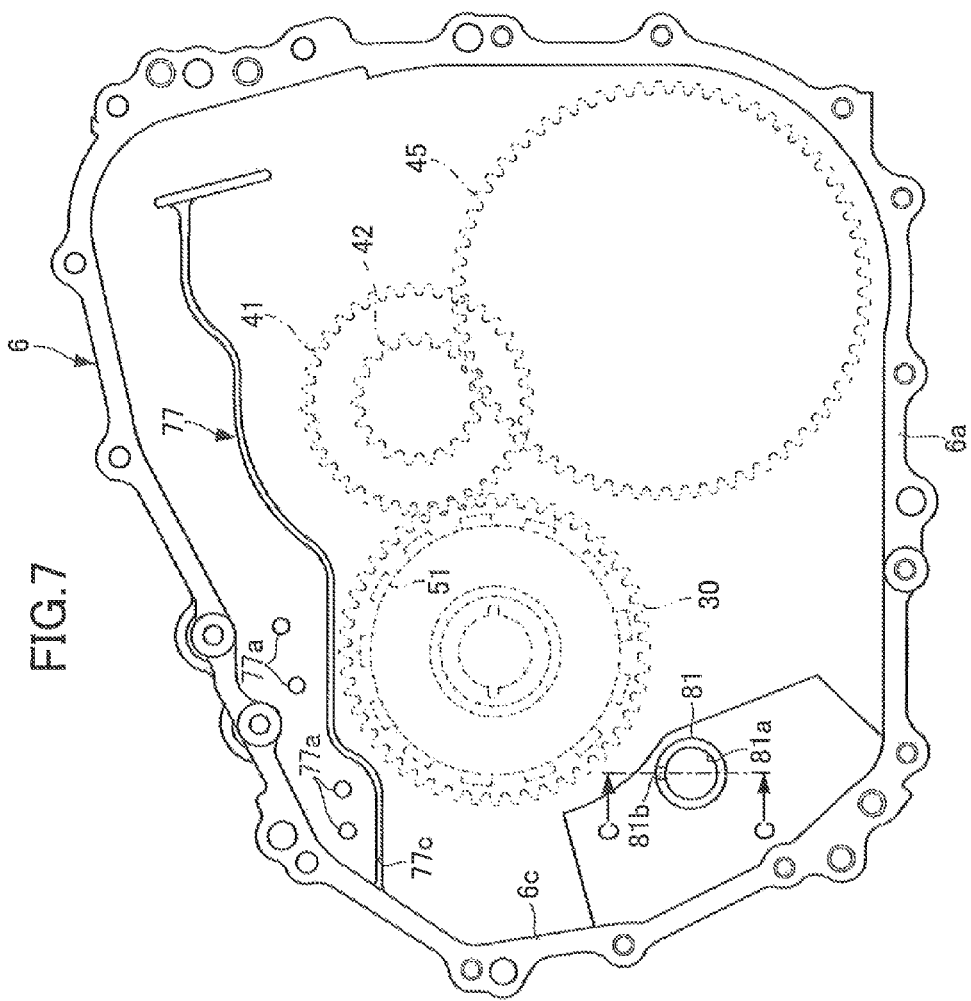
FIG. 7 is a view showing a second embodiment of the parking lock mechanism of the power transmission apparatus according to the present invention, and is a side view of the extension housing seen from the engine side housing.
Figure 8:
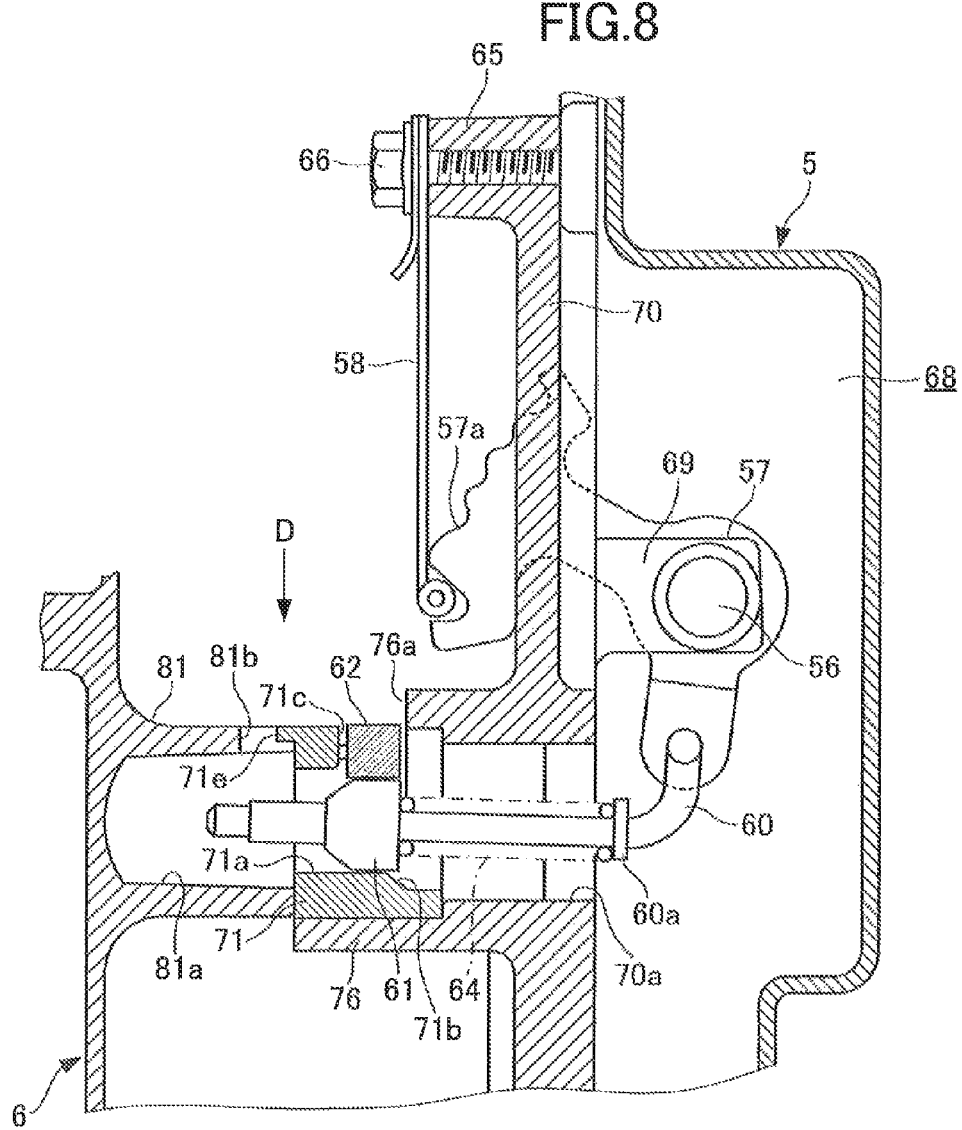
FIG. 8 is a view showing the second embodiment of the parking lock mechanism of the power transmission apparatus according to the present invention, and is a cross-sectional view of the parking lock mechanism taken and seen from the line A-A in FIG. 2 in a parking lock state and corresponding to a cross-sectional view of the parking lock mechanism taken and seen from the line CC in FIG. 7.

FIGS. 7 to 15 are views showing a second embodiment of the parking lock mechanism of the power transmission apparatus according to the present invention. The parking lock mechanism according to the second embodiment will be explained hereinafter with the constitution parts and elements forming the second embodiment bearing the same reference numerals as those of the first embodiment, thereby omitting the explanation about the same constitution parts and elements. The extension housing 6 is shown in FIG. 7 to be formed with a cylindrical portion 81 constituting a cylindrical member and a second cylindrical member defined in the present invention. The cylindrical portion 81 is held in abutment with the axial one end of the sleeve 71, thereby positioning the sleeve 71 with respect to the extension housing 6, so that the sleeve 71 is supported on the engine side housing 5 and the extension housing 6.

The cylindrical portion 81 has an inner peripheral portion 81a held in communication with the inner peripheral portion 71a of the sleeve 71 and constituting a second inner peripheral portion. The cylindrical portion 81 has an upper portion formed with an upper notch 81b held in communication with the inner space 34b of the transaxle case 4 and constituting an upper opening.

The upper notch 81b thus formed functions to introduce the oil circulating in the transaxle case 4, viz., the oil discharged from the oil discharge opening 77c of the catch tank 77, into the inner peripheral portion 81a of the cylindrical portion 81.

The oil thus introduced into the inner peripheral portion 81a of the cylindrical portion 81 is introduced into the inner peripheral portion 71a of the sleeve 71 to lubricate the sliding surface of the parking cam 61. The cylindrical portion 81 in the present embodiment constitutes a supply unit.

Figure 9:
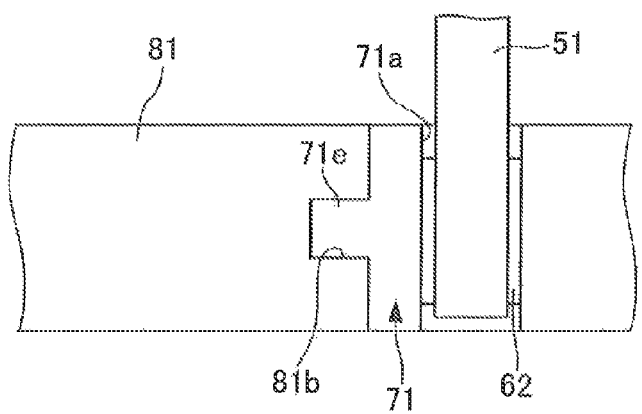
FIG. 9 is a view showing the second embodiment of the parking lock mechanism of the power transmission apparatus according to the present invention, and is a plan view of the essential portion of the parking lock mechanism seen from the D direction in FIG. 8.

As shown in FIG. 9, the axial one end portion of the sleeve 71 has an upper portion formed with a stopper portion 71e in lieu of the stopper portion 71d. The stopper portion 71e is engaged with the upper notch 81b of the cylindrical portion 81, so that the sleeve 71 is prevented from being rotated with respect to the retaining portion 76.

In the transaxle 1 in the present embodiment, the oil scooped up to the catch tank 77 by the final ring gear 45 is introduced into the motor accommodation chambers 19, 34a through the oil introduction openings 77a, 77h of the catch tank 77 to cool the stators 20, 35 of the motor generators MG1, MG2.

Further, the oil scooped up by the final ring gear 45 is supplied to the meshing portions of the final gear 45 with the counter driven gear 41, and the meshing portions of the final drive gear 42 with the counter drive gear 30, so that the above meshing portions can fully be lubricated.

Further, the oil supplied to the catch tank 77 is then dropped into the inner space 34b through the oil discharge opening 77c. The oil thus dropped is partly introduced into the inner peripheral portion 81a of the cylindrical portion 81 through the upper notch 81b of the cylindrical portion 81, and then introduced from the inner peripheral portion 81a to the inner peripheral portion 71a of the sleeve 71. The oil can be supplied to the sliding surface of the parking cam 61, viz., the sliding surface between the parking cam 61 and the sleeve 71 and the sliding surface between the parking cam 61 and the parking pawl 62, so that the sliding surface between the parking cam 61 and the sleeve 71 and the sliding surface between the parking cam 61 and the parking pawl 62 can be lubricated by the supplied oil.

As has been described in the above, the parking lock mechanism 52 according to the present embodiment is constructed to be provided on the parking cover 70 of the extension housing 6 with the axial one end portion of the sleeve 71 being held in abutment with the cylindrical portion 81, and to have a cylindrical portion 81 supported on the engine side housing 5 and the extension housing 6 with the sleeve 71 being positioned with respect to the extension housing 6. The cylindrical portion 81 has an inner peripheral portion 81a held in communication with the inner peripheral portion 71a of the sleeve 71, and also held in communication with the inner space 34b occupying the upper portion of the transaxle case 4. The cylindrical portion 81 is formed with an upper notch 81b through which the oil is introduced into the inner peripheral portion 81a of the cylindrical portion 81.

For this reason, the oil thus introduced into the inner peripheral portion 81a of the cylindrical portion 81 through the upper notch 81b can be supplied to the inner peripheral portion 71a of the sleeve 71 from the inner peripheral portion 81a of the cylindrical portion 81. As a consequence, the sliding surface between the parking cam 61 and the sleeve 71 and the sliding surface between the parking cam 61 and the parking pawl 62 can positively be lubricated by the oil, thereby making it possible to decrease the sliding resistance of the parking cam 61. The sliding surface between the parking cam 61 and the sleeve 71 and the sliding surface between the parking cam 61 and the parking pawl 62 can therefore be suppressed from being worn down.

Due to the fact that the sliding resistance of the parking cam 61 can be lessened, it is possible to reduce the torque amount of the motor 54 of the actuator 53, thereby making it possible to downsize the actuator 53 and to lower the production cost of the actuator 53.

The parking lock mechanism 52 according to the present embodiment is constructed to have the axial one end portion of the sleeve 71 be held in abutment with the cylindrical portion 81, thereby making it possible to increase the contact area of the sleeve 71 with the cylindrical portion 81.

The contact area thus increased of the sleeve 71 with the cylindrical portion 81 makes it possible to prevent the sleeve 71 from being inclined, so that the phase difference of the relative positions of the sliding surface between the parking cam 61 and the sleeve 71 is alleviated, thereby making it possible to reduce the deviation of the pressure force of the parking cam 61 applied to the sliding portions between the parking cam 61 and the sleeve 71. This makes it unnecessary to unnecessarily increase the required torque of the actuator 53 in consideration of the sliding resistance of the sliding surface between the parking cam 61 and the sleeve 71.

The deviation thus reduced of the pressure force of the parking cam 61 applied to the sliding portions of the parking cam 61 with the sleeve 71 makes it possible to decrease the sliding resistance of the sliding surface between the parking cam 61 and the sleeve 71, it is therefore possible to use an actuator 53 having a motor 54 small in torque amount by the decreased sliding resistance. As a consequence, the actuator 53 can be downsized, and be lowered in production cost.

Figure 10:
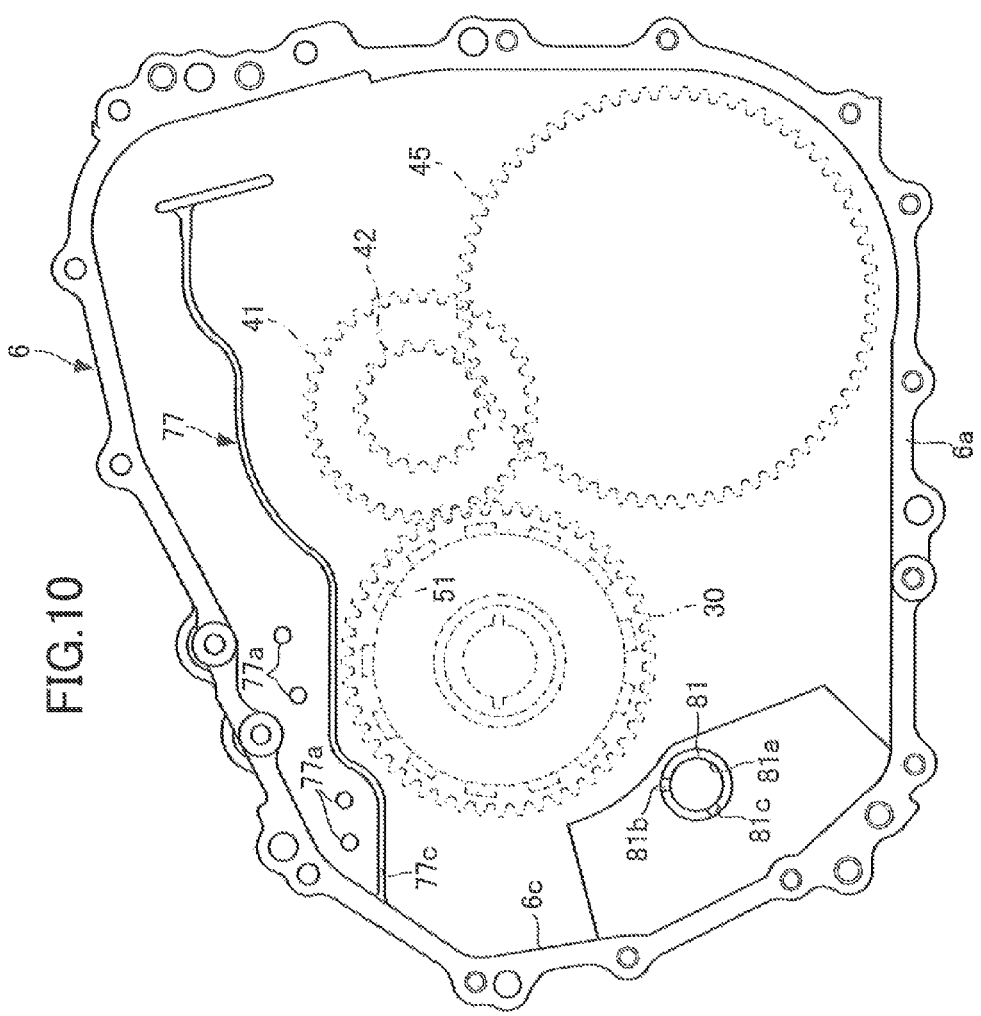
FIG. 10 is a view showing the second embodiment of the parking lock mechanism of the power transmission apparatus according to the present invention, and is a side view of the extension housing having a cylindrical portion in another form seen from the engine side housing.
Figure 11:
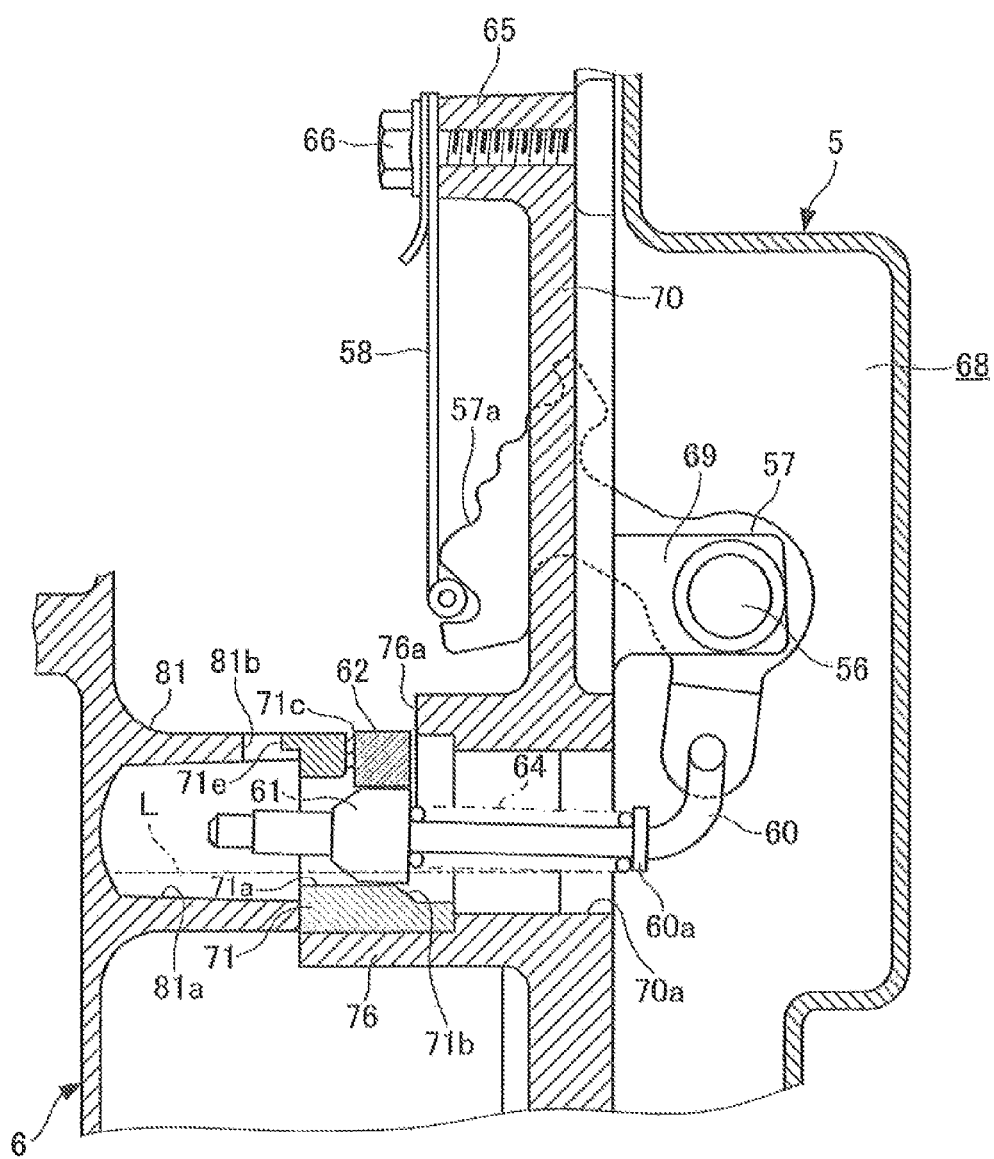
FIG. 11 is a view showing the second embodiment of the parking lock mechanism of the power transmission apparatus according to the present invention, and is a cross-sectional view of the parking lock mechanism having a cylindrical portion in another form.

The present embodiment is constructed to have the cylindrical portion 81 with no discharge opening, however, the cylindrical portion 81 may have an lower notch 81c serving as a discharge opening to discharge the oil introduced into the cylindrical portion 81 as shown in FIG. 10. The cylindrical portion 81 with the lower notch 81c thus constructed can discharge the oil introduced into the cylindrical portion 81 through the lower notch 81c, thereby making it possible to prevent a predetermined amount of oil from being accumulated in the sleeve 71 as shown in FIG. 11.

In other words, in the parking lock state of the parking lock mechanism, the sleeve 71 supplied from the cylindrical portion 81 with an amount of oil more than needed results in the fact that the friction resistance of the sliding surface between the parking cam 61 and the sleeve 71 decreases at a level more than needed, thereby leading to the fact that there is generated a requirement to increase the spring constant of the spring 64.

More specifically, the parking cam 61 is resiliently urged toward the cylindrical portion 81 by the spring 64 in the parking lock state of the parking lock mechanism, thereby preventing the parking cam 61 from moving away from the parking pawl 62.

For this reason, the frictional resistance of the sliding portion of the sleeve 71 with the parking cam 61 being decreased at a level more than needed makes it easy for the parking cam 61 to be moved away from the parking pawl 62 against the urging force of the spring 64, thereby requiring the spring constant of the spring 64 to be increased to urge the parking cam 61 with a large urging force so as to prevent the parking cam 61 from being moved away from the parking pawl 62.

This results in the fact that the spring 64 is required to be increased in size to increase the spring constant of the spring 64, thereby leading to making the parking lock mechanism 52 increase in size.

In view of the foregoing situation of the parking lock mechanism, the cylindrical portion 81 is formed with the lower notch 81c to discharge the oil introduced into the sleeve 71, thereby preventing a predetermined amount of oil from being accumulated in the sleeve 71, and thereby making it possible to secure only the oil required to lubricate the sliding portion of the sleeve 71 with the parking cam 61. This makes it possible to prevent the frictional resistance of the sliding surface of the sleeve 71 with the parking cam 61 from being decreased at a level more than needed, thereby resulting in making it unnecessary to increase the spring constant of the spring 64, and thereby making it possible to prevent the parking lock mechanism 52 from being made large in size.

Further, the lower notch 81c formed in the cylindrical portion 81 causes the amount of oil accumulated in the inner peripheral portion 81a of the cylindrical portion 81 to be decreased, thereby lowering the liquid surface of the oil, so that at least the contact surface of the parking cam 61 with the cylindrical portion 81 can be lubricated although it is difficult to supply the oil to the contact surfaces of the parking pawl 62 with the parking earn 61, thereby making it possible to decrease the sliding resistance of the parking cam 61.

Further, the axial one end portion of the sleeve 71 may be provided with a stopper portion to be engaged with the lower notch 81c, thereby making it possible to prevent the sleeve 71 from being pivoted by the stopper portion and the stopper portion 71e formed on the upper portion of the sleeve 71.

The lower notch 81c is preferably formed in the cylindrical portion 81 with the lower notch 81c and the upper notch 81b being in asymmetrical relationship with respect to the central axis of the cylindrical portion 81. The lower notch 81c thus formed makes it possible to assemble the sleeve 71 to the retaining portion 76 in the state that the stopper portion 71e to be engaged with the upper notch 81b and the stopper portion to be engaged with the lower notch 81c preliminarily take respective regular positions when the sleeve 71 is assembled with the retaining portion 76, thereby making it possible to prevent the sleeve 71 from being erroneously assembled with the retaining portion 76.

Figure 13:
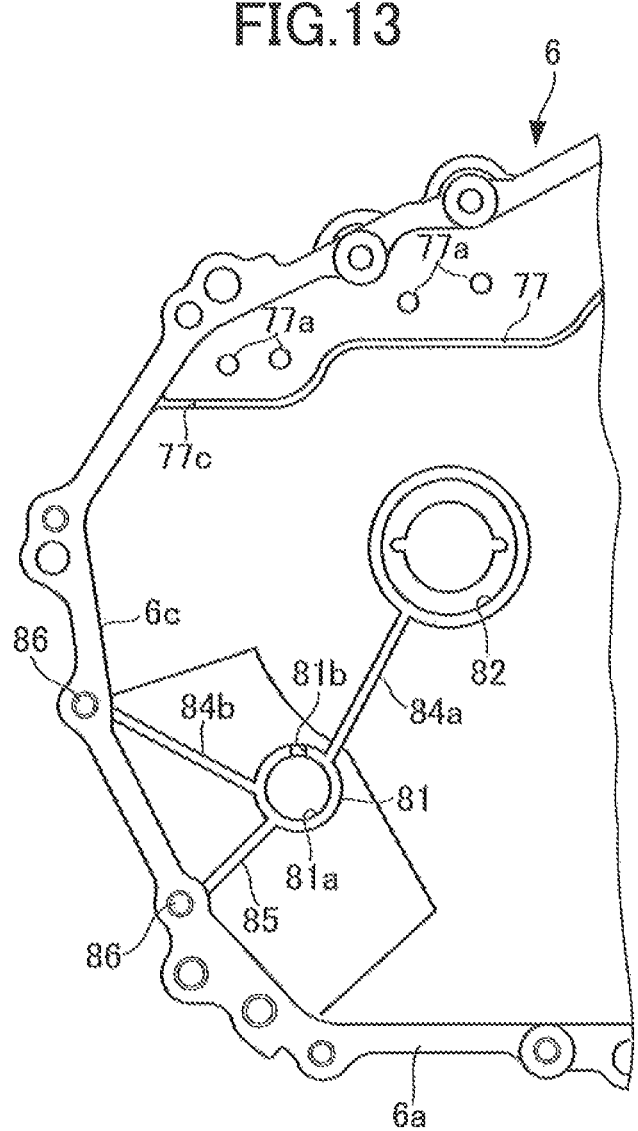
FIG. 13 is a view showing the second embodiment of the parking lock mechanism of the power transmission apparatus according to the present invention, and is a side view of the essential portion of the extension housing in another form seen from the engine side housing.
Figure 14:
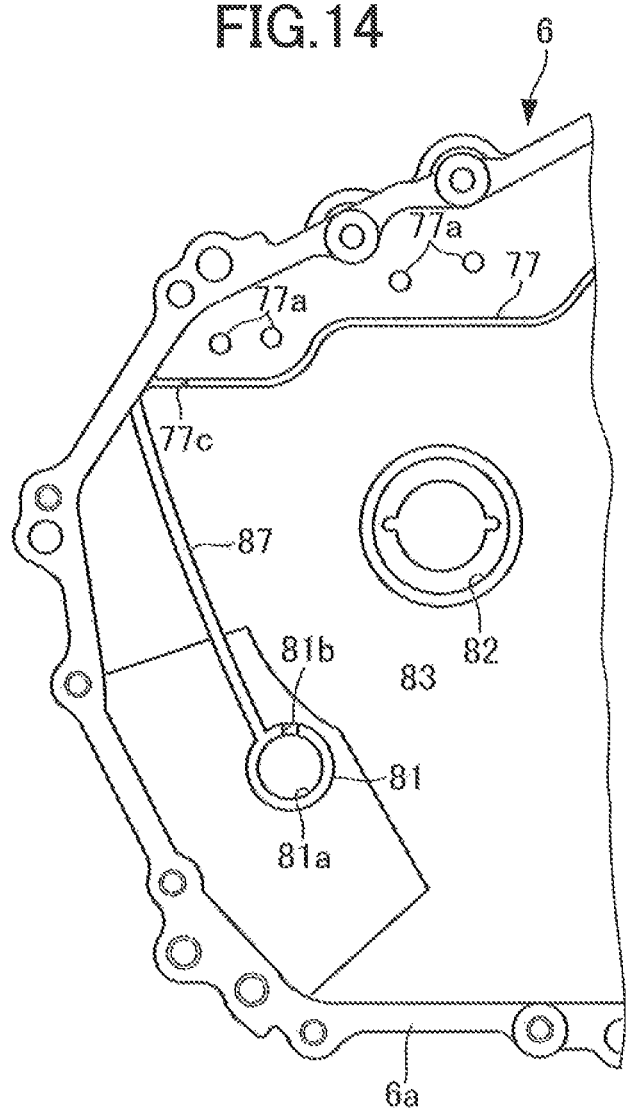
FIG. 14 is a view showing the second embodiment of the parking lock mechanism of the power transmission apparatus according to the present invention, and is a side view of the essential portion of the extension housing in another form seen from the engine side housing.

The upper notch 81b and the lower notch 81c are each preferably casted as a notch when the extension housing 6 is casted. This casting method makes it possible to reduce the number of working sections and members of the housing 6, and to decrease the production cost of the extension housing 6, thereby resulting in enabling the production cost of the transaxle 1 to be reduced. The present embodiment may be constructed to have ribs at the outer peripheral portion of the cylindrical portion 81 as shown in FIGS. 12 to 14.

Figure 12:
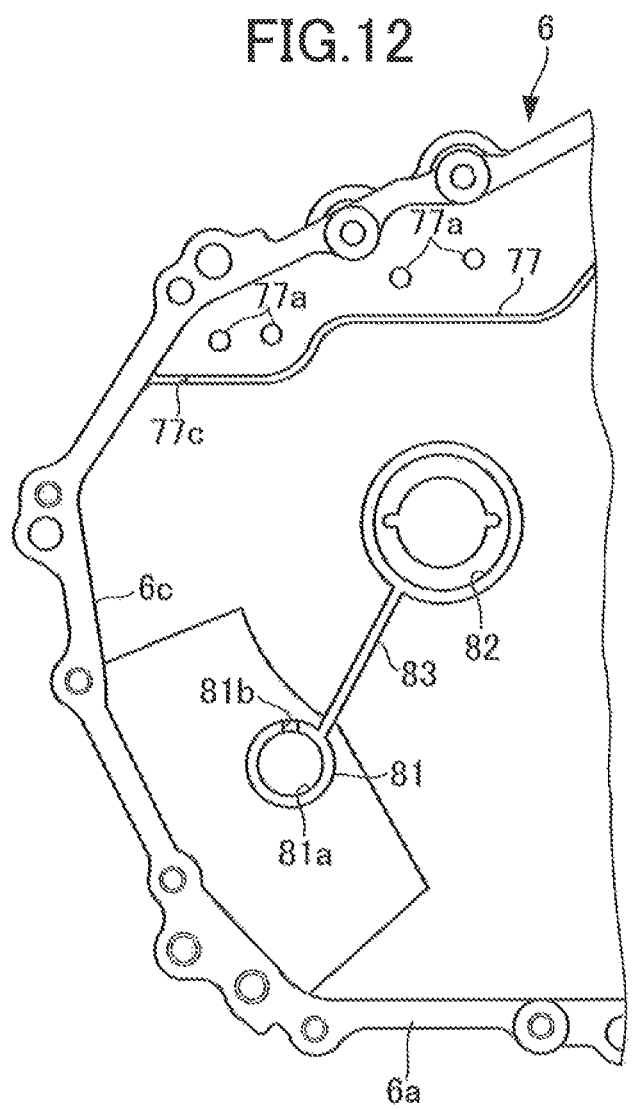
FIG. 12 is a view showing the second embodiment of the parking lock mechanism of the power transmission apparatus according to the present invention, and is a side view of the essential portion of the extension housing in another form seen from the engine side housing.

FIG. 12 shows a guide rib 83 extending to the cylindrical portion 81 from the opening portion 82 formed in the extension housing 6 for use in retaining the bearing. The guide rib 83 and the cylindrical portion 81 thus constructed constitute in combination a supply unit.

The guide rib 83 and the cylindrical portion 81 thus constructed functions together to make it possible to guide the oil lubricating the bearing to the guide rib 83 through the opening portion 82, thereby making it possible to supply much more oil to the upper notch 81b of the cylindrical portion 81 to enhance the lubrication property of the sliding surface of the parking cam 61.

For casting the extension housing 6, the opening portion 82 with a thick thickness and the cylindrical portion 81 also with a thick thickness are connected with each other by the guide rib 83, thereby making it possible to enhance the casting property of the engine side housing 5. This makes it possible to facilitate the production work of the transaxle case 4, and to reduce the production cost of the transaxle case 4, thereby resulting in making it possible to reduce the production cost of the transaxle 1.

FIG. 13 shows a guide rib 84a and guide ribs 84b, 85. The guide rib 84a extends to the cylindrical portion 81 from the opening portion 82 for use in retaining the bearing. The guide ribs 84b, 85 extend from the cylindrical portion 81 to bolt bores 86 formed in the opening end 6a of the extension housing 6. The guide ribs 84a, 84b and the cylindrical portion 81 thus constructed constitute in combination a supply unit.

The guide ribs 84a, 84b, and the cylindrical portion 81 are combined together not only to make it possible to catch the oil flowing along the side wall 6c of the extension housing 6 with the guide ribs 84a, 84b and to guide the oil to the cylindrical portion 81, but also to make it possible to guide the oil lubricating the bearing through the opening portion 82 to the guide rib 83, thereby making it possible to supply much more oil to the upper notch 81b of the cylindrical portion 81 to enhance the lubrication property of the sliding surface of the parking cam 61.

The guide ribs 84a, 84b, 85 extending from the cylindrical portion 81 to the bolt bores 86 surrounded by parts of the extension housing 6 with a high fastening strength, viz., to the sections of the extension housing 6 to be screwed by the bolts makes it possible to heighten the rigidity of the transaxle case 4.

FIG. 14 show a guide rib 87 formed on the extension housing 6 to extend from the cylindrical portion 81 to the oil discharge opening 77c of the catch tank 77. The guide rib 87 and the cylindrical portion 81 thus constructed constitute in combination a supply unit.

The guide rib 87 and the cylindrical portion 81 thus constructed make it possible to guide the oil discharged from the oil discharge opening 77c to the cylindrical portion 81 through the guide rib 87, thereby making it possible to enhance the lubrication property of the sliding surface of the parking cam 61.

Due to the fact that the oil discharge opening 77c is formed at the lower portion of the catch tank 77, the oil can preferentially be supplied to the cylindrical portion 81 through the guide rib 87, thereby making it possible to enhance the lubrication property of the sliding surface of the parking cam 61.

Figure 15:
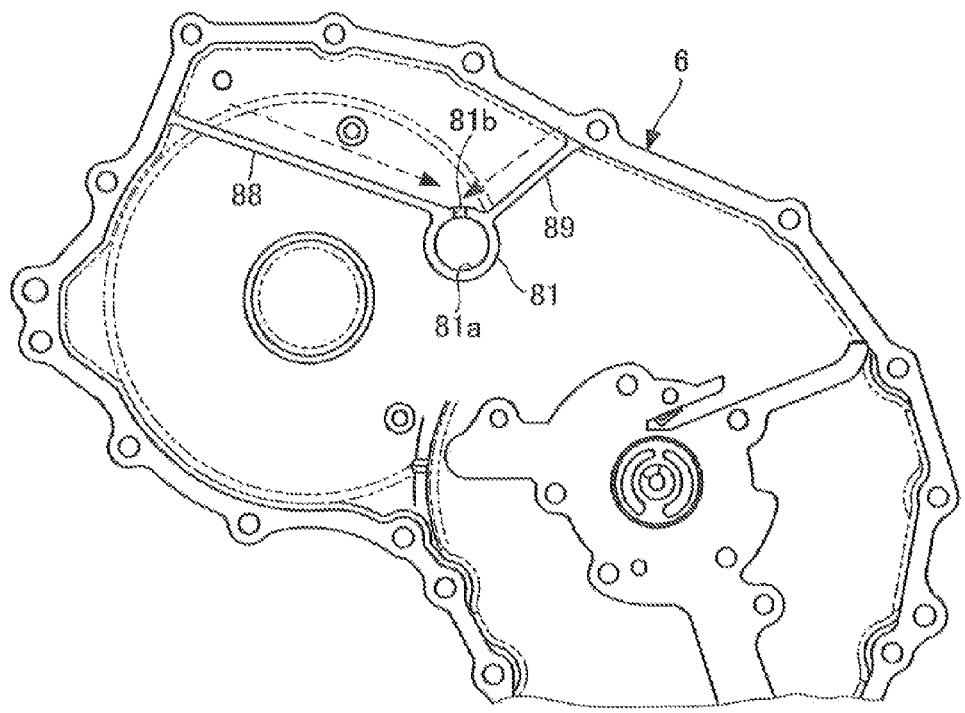
FIG. 15 is a view showing the second embodiment of the parking lock mechanism of the power transmission apparatus according to the present invention, and is a side view of the casing in another form.

Further, the cylindrical portion 81 and the sleeve 71 may be positioned away from those constructed in the foregoing embodiments as shown in FIG. 15, in which there are provided guide ribs 88, 89 at a flat portion of the extension housing 6 formed to face the outer surface of the casing through which the transaxle case 4 generates radiation sound, for example, to face the outer surface of the extension housing 6. In this construction, the oil dropped from the catch tank or the oil scooped up by the final gear 45 is supplied to the cylindrical portion 81 through the guide ribs 88, 89. The guide ribs 88, 89 and the cylindrical portion 81 thus constructed constitute in combination a supply unit.

In the above construction, the surface rigidity of the flat portion of the extension housing 6 can be enhanced by the guide ribs 88, 89 for guiding the oil to the cylindrical portion 81, and further can reduce the radiation sound, thereby making it possible to enhance the NV (noise and vibration) property.

The above construction makes it possible to make it unnecessary to provide additional ribs on the extension housing 6 for the purpose of enhancing the surface rigidity of the extension housing 6, and to increase the thickness of the extension housing 6, so that the production cost of the transaxle case 4 is reduced, thereby resulting in making it possible to reduce the production cost of the transaxle 1.

The present embodiment is constructed to have the cylindrical portion 81 integrally formed with the extension housing 6, viz., directly provided on the extension housing 6, however, the extension housing 6 may be formed with a guide plate serving as a support member on which the cylindrical portion 81 is provided.

In this construction, the sleeve 71 is positioned with respect to the engine side housing 5 and the extension housing 6 through the cylindrical portion 81 and the guide plate, and is supported on the engine side housing 5 and the extension housing 6.

Third Embodiment

Figure 16:
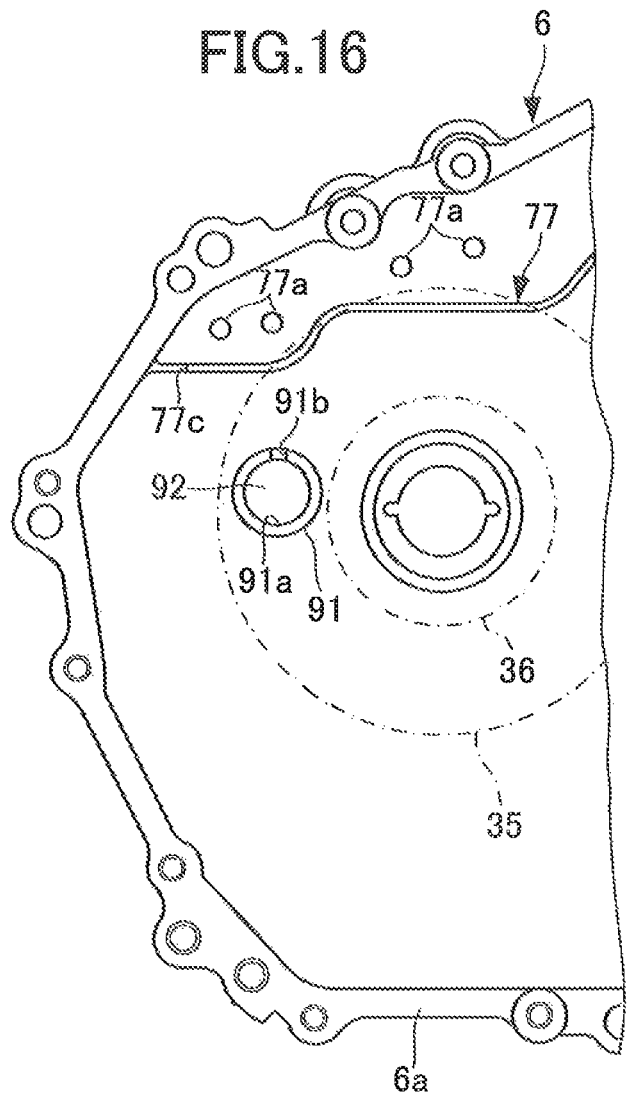
FIG. 16 is a view showing a third embodiment of the parking lock mechanism of the power transmission apparatus according to the present invention, and is a side view of the essential portion of the extension housing seen from the engine side housing.
Figure 17:
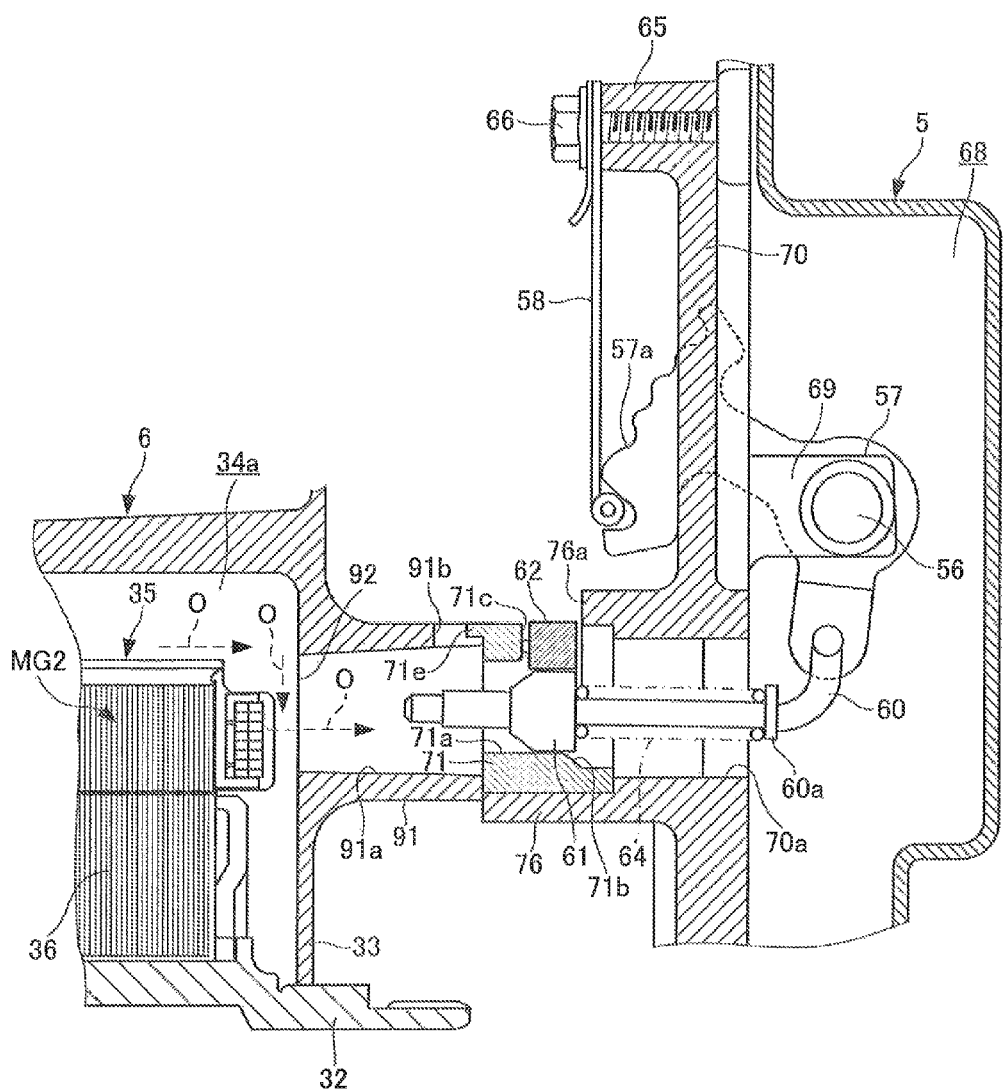
FIG. 17 is a view showing the third embodiment of the parking lock mechanism of the power transmission apparatus according to the present invention, and is a cross-sectional view of the parking lock mechanism.
Figure 18:
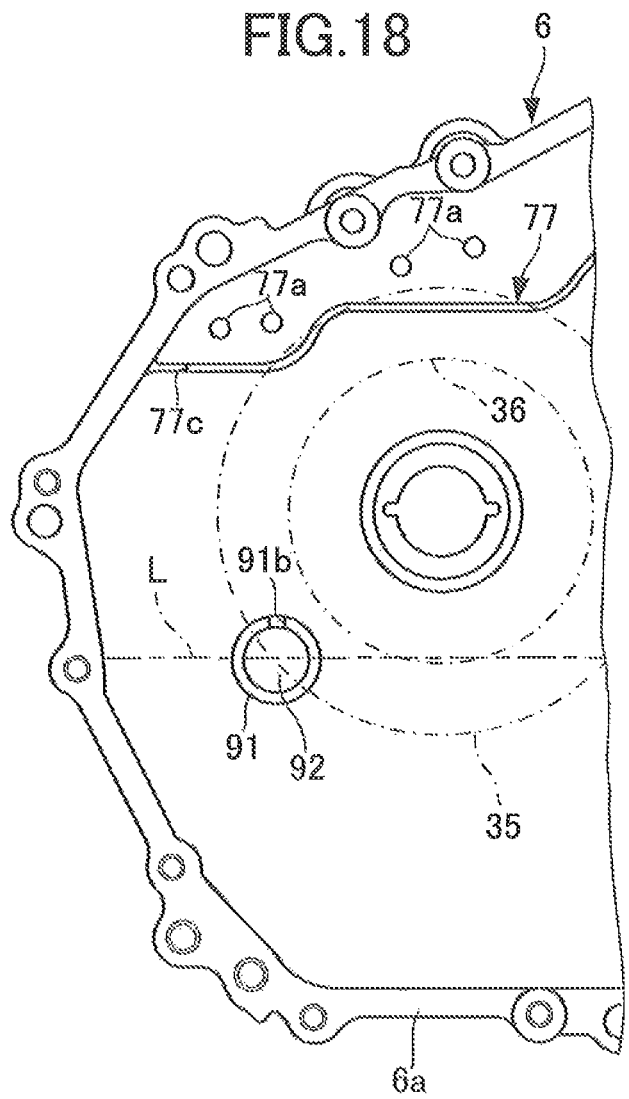
FIG. 18 is a view showing the third embodiment of the parking lock mechanism of the power transmission apparatus according to the present invention, and is a side view of the essential portion of the extension housing having a cylindrical portion set at another assembling position seen from the engine side housing.

FIGS. 16 to 18 are views showing a third embodiment of the parking lock mechanism of the power transmission apparatus according to the present invention. The parking lock mechanism according to the third embodiment will be explained hereinafter with the constitution parts and elements forming the third embodiment bearing the same reference numerals as those of the first embodiment, thereby omitting the explanation about the same constitution parts and elements.

In FIGS. 16 and 17, the motor accommodation chamber 34a is defined by the engine side housing 5 and the end cover 7 together with the partition wall 33 having one side surface facing the motor generator MG2 constituting a rotating motor and the other side surface facing the sleeve 71 and formed with a cylindrical portion 91 constituting a cylindrical member and a second cylindrical member.

The cylindrical portion 91 has an inner peripheral portion 91a constituting a second inner portion held in communication with the inner peripheral portion 71a of the sleeve 71, and has an upper portion formed with an upper notch 91b constituting an upper opening held in communication with the space formed at the upper portion of the transaxle case 4.

The partition wall 33 is formed with an introduction bore 92 which is formed to communicate the motor accommodation chamber 34a with the inner peripheral portion 91a of the cylindrical portion 91. The cylindrical portion 91 has the other axial end portion projecting toward the sleeve 71 from the partition wall 33, and one axial end portion held in abutment with one axial end portion of the sleeve 71. This means that the inner peripheral portion of the sleeve 71 is held in communication with the motor accommodation chamber 34a through the inner peripheral portion 91a of the cylindrical portion 91 and the introduction bore 92.

In the present embodiment, the oil scooped up to the catch tank 77 by the final gear 45 is introduced into the motor accommodation chamber 34a through the oil introduction opening 77a of the catch tank 77 to cool the stator 35 of the motor generator MG2.

The oil having the stator 35 cooled is bounced back from the stator 35 and introduced into the inner peripheral portion 91a of the cylindrical portion 91 and the inner peripheral portion 71a of the sleeve 71 through the introduction bore 92 (see an arrow "O" in FIG. 17). The oil introduced into the inner peripheral portion 71a of the sleeve 71 is then supplied to the sliding surface between the parking cam 61 and the sleeve 71. The cylindrical portion 91 and the partition wall 33 thus constructed in the present embodiment constitute in combination a supply unit.

In the present embodiment, the partition wall 33 of the extension housing 6 is formed with the introduction bore 92, and has the cylindrical portion 91 provided with inner peripheral portion 91a projecting from the introduction bore 92 toward the sleeve 71 to be abutted with the axial one end portion of the sleeve 71 and being held in communication with the inner peripheral portion 71a of the sleeve 71, so that the lubrication oil having cooled the motor generator MG2 is supplied to the sliding surface of the parking cam 61 from the introduction bore 92 through the inner peripheral portion 91a of the cylindrical portion 91 and the inner peripheral portion 71a of the sleeve 71, thereby making it possible to decrease the sliding resistance of the parking cam 61. For this reason, the parking lock mechanism 52 thus constructed can suppress the sliding surface between the parking cam 61 and the parking pawl 62 and the sliding surface between the parking cam 61 and the sleeve 71 from being abraded.

The parking lock mechanism 52 can take advantage of the introduction bore 92 for discharging the lubrication oil to cool the rotation motor MG2 to lubricate the sliding surface of the parking cam 61 with the lubrication oil passing through the introduction bore 92, so that the parking lock mechanism 52 can make it unnecessary to assemble an exclusive bore for lubricating only the parking cam 61, thereby making it possible to reduce hourly labor units needed for forming the introduction bore 92, and thereby to reduce the production cost of the transaxle case 4

The stress is considered to be collected around the introduction bore 92, however, the stress can be eased from being collected around the introduction bore 92 with the thickness of the partition wall 33 around the introduction bore 92 being secured, resulting from the fact that the axial one end portion of the sleeve 71 is held in abutment with the axial other end portion of the cylindrical portion 91, thereby increasing the sliding surface area of the sleeve 71 with the cylindrical portion 91.

While the present embodiment has been described with the introduction bore 92 being provided in the vicinity of the upper end of the stator 35, the introduction bore 92 may be formed at the section of the partition wall 33 in the vicinity of the lower end of the rotor 36 of the motor generator MG2 as shown in FIG. 18.

The above construction with the introduction bore 92 being formed at the section of the partition wall 33 in the vicinity of the lower end of the rotor 36 of the motor generator MG2 makes it possible to set the liquid surface L of the oil in the motor accommodation chamber 34a in the vicinity of the lower end of the rotor 36 to prevent the rotor 36 from being fully soaked in the oil. For this reason, the agitation resistance of the rotor 36 is decreased, thereby preventing the power transmission efficiency of the transaxle 1 from being deteriorated.

Due to the fact that the oil can reliably be supplied to the stator 35 through the oil introduction opening 77a of the catch tank 77 even if the introduction bore 92 is set to be positioned in the vicinity of the lower end of the rotor 36, the heat exchange between the stator 35 and the oil can be promoted, thereby making it possible to enhance the cooling efficiency of the motor generator MG2. Even if the motor generator MG2 small in size with a small heat capacity is used, the motor generator MG2 can hilly be cooled, thereby making it possible to downsize and lighten the transaxle 1.

Fourth Embodiment

Figure 19:
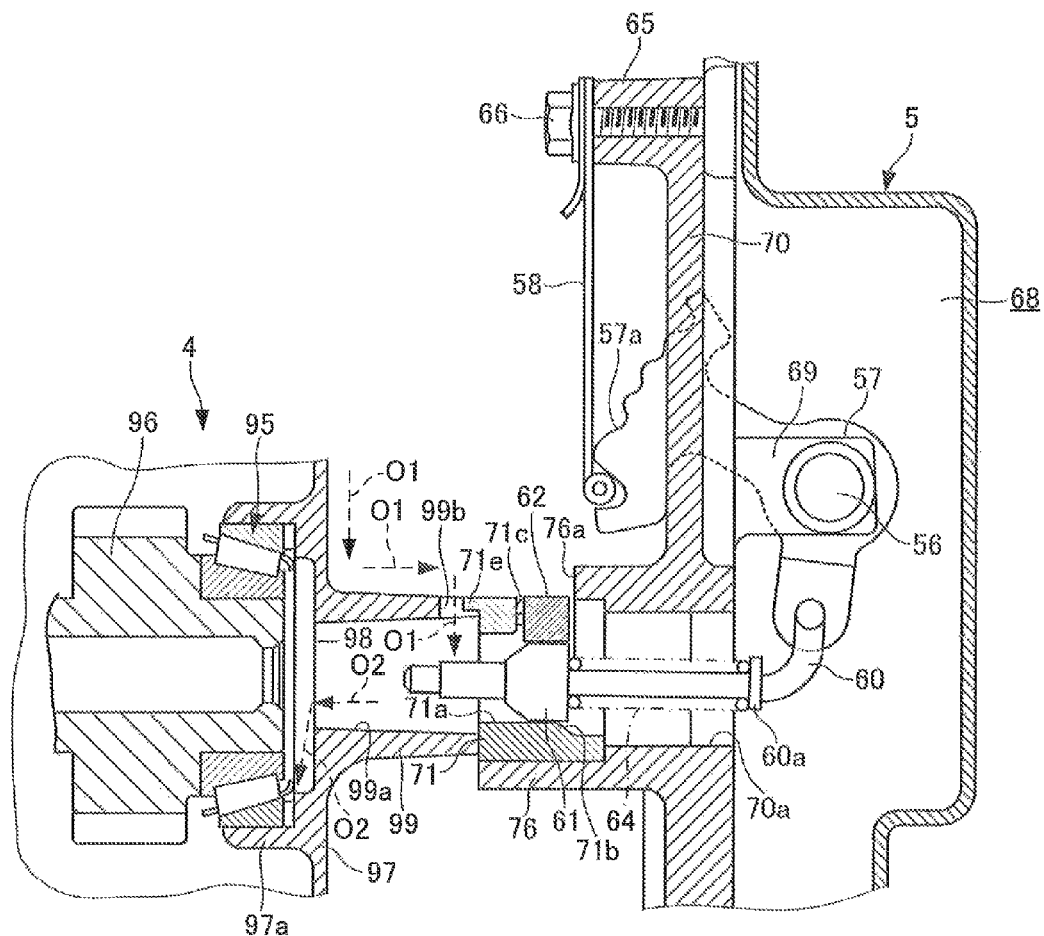
FIG. 19 is a view showing a fourth embodiment of the parking lock mechanism of the power transmission apparatus according to the present invention, and is a cross-sectional view of the parking lock mechanism.
Figure 20:
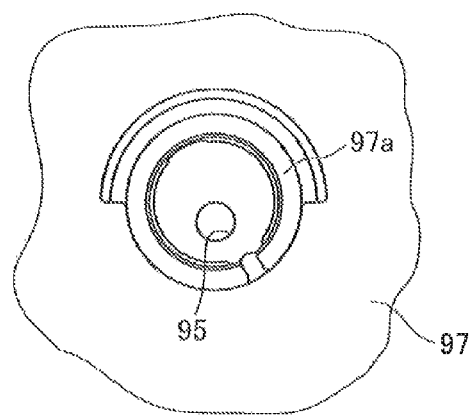
FIG. 20 is a view showing the fourth embodiment of the parking lock mechanism of the power transmission apparatus according to the present invention, and is a side view of the essential portion of a partition wall seen from a support portion.
Figure 21:
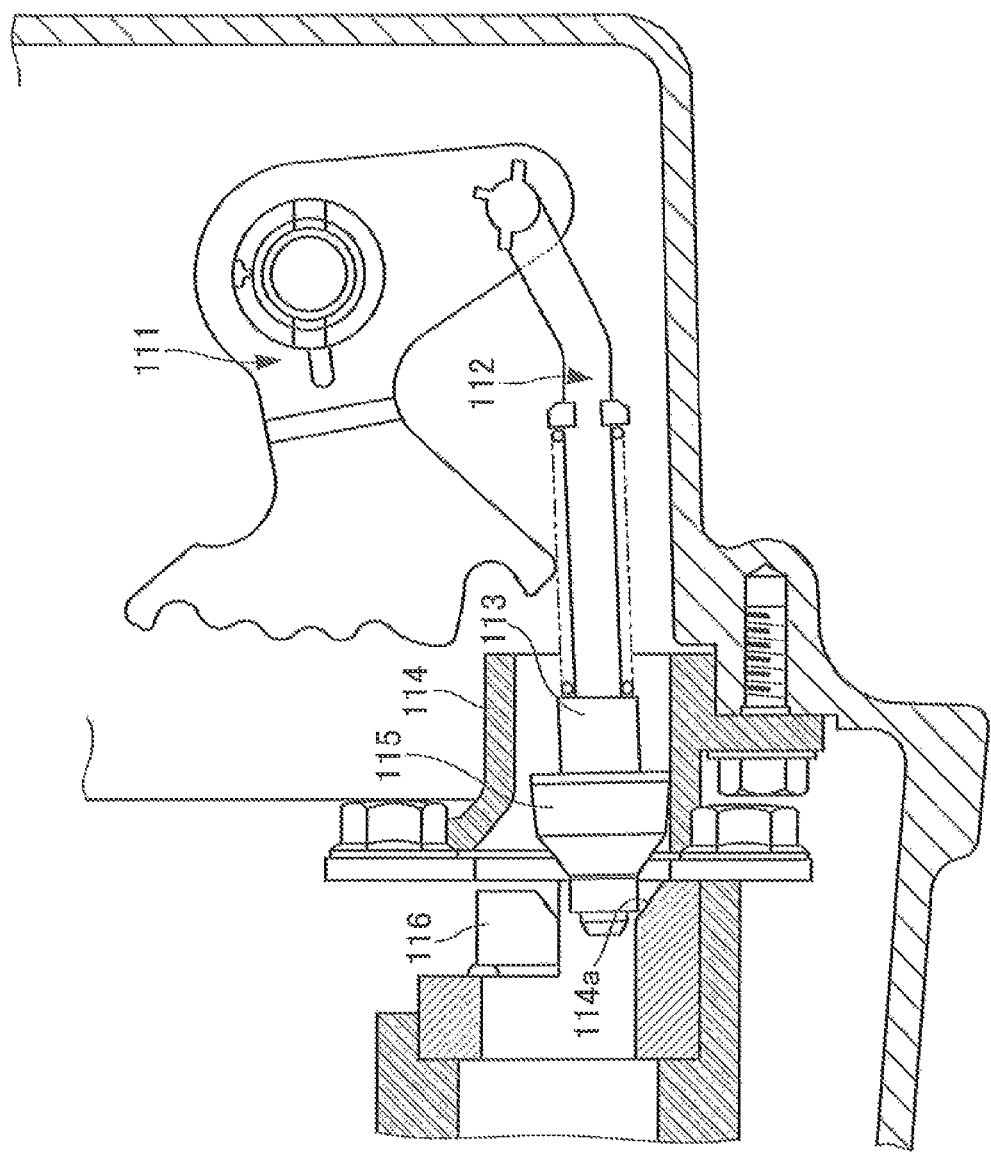
FIG. 21 is a cross-sectional view of a conventional parking lock mechanism.

FIGS. 19 and 20 are views showing a fourth embodiment of the parking lock mechanism of the power transmission apparatus according to the present invention. The parking lock mechanism according to the fourth embodiment will be explained hereinafter with the constitution parts and elements forming the fourth embodiment bearing the same reference numerals as those of the first embodiment, thereby omitting the explanation about the same constitution parts and elements.

The present embodiment will be explained hereinafter as shown in FIG. 19 for example with the transaxle case 4 provided with a partition wall 97 having a support portion 97a which is adapted to rotatably support an axial one end portion of a rotation shaft 96 through bearing 95. The partition wall 97 seen from the support portion 97a side is shown by FIG. 20.

The partition wall 97 is formed with an introduction bore 98, and has the other end surface of the partition wall 97 opposing to the support portion 97a across the introduction bore 98, the other end surface being formed with a cylindrical portion 99 constituting a second cylindrical member. The cylindrical portion 99 has an axial one end portion integrally formed with the partition wall 97 in such a manner that the inner peripheral portion 99a of the cylindrical portion 99 constituting a second inner peripheral portion is held in communication with the introduction bore 98. The cylindrical portion 99 has the other axial end portion held in abutment with the axial one portion of the sleeve 71. The cylindrical portion 99 has an upper portion formed with an upper notch 99b constituting an upper opening held in communication with the inner space 34b occupying the upper portion of the transaxle case 4.

For this reason, the oil (see an arrow "O1" in FIG. 19) introduced into the inner peripheral portion 71a of the sleeve 71 through the upper notch 99b is introduced from the inner peripheral portion 99a of the cylindrical portion 99 into the bearing 95 through the introduction bore 98 of the partition wall 97 (see an arrow "O2" in FIG. 19).

In present embodiment, the oil accumulated in the bottom portion of the transaxle case 4 is scooped up by the final ring gear 45 to be supplied to the catch tank 77.

The oil supplied to the catch tank 77 is dropped into the inner space 34b through the oil discharge opening 77c, and is then partly introduced into the inner peripheral portion 99a of the cylindrical portion 99 through the upper notch 99b of the cylindrical portion 99. The oil is then introduced into the inner peripheral portion 71a of the sleeve 71 from the inner peripheral portion 99a of the cylindrical portion 99.

The oil is then supplied to the sliding surface of the parking cam 61, viz., the sliding surface between the parking cam 61 and the sleeve 71 and the sliding surface between the parking can 61 and the parking pawl 62, so that the sliding surface between the parking cam 61 and the sleeve 71 and the sliding surface between the parking can 61 and the parking pawl 62 can be lubricated by the oil thus supplied.

Further, the oil introduced into the cylindrical portion 99 is then supplied to the bearing 95 from the introduction bore 98, so that the bearing 95 can be lubricated by the oil thus supplied.

As will be understood from the foregoing description, the parking lock mechanism 52 according to the present embodiment is constructed to include a cylindrical portion having an axial one end portion at the partition wall 97 with the inner peripheral portion 99a of the cylindrical portion 99 being held in communication with the introduction bore 98, and an axial other end portion projecting from the axial one end portion toward the sleeve 71 to be abuted with the other end portion of the sleeve 71 and to be communicated with the inner peripheral portion 71a of the sleeve 71, so that the oil introduced into the inner peripheral portion 99a of the cylindrical portion 99 can be supplied to the bearing 95 through the introduction bore 98. Therefore, the parking lock mechanism 52 thus constructed can lubricate not only the sliding surface of the parking cam 61, viz., the sliding surface between the parking can 61 and the sleeve 71 but also the bearing 95 by taking advantage of a single cylindrical portion 99.

As a consequence, the parking lock mechanism 52 according to the present embodiment can make it unnecessary to assemble an exclusive constitutional element for lubricating only the bearing 95 in the transaxle case 4, thereby making it possible to simplify the construction of the transaxle case 4 as well as to lighten the transaxle case 4. Therefore, the parking lock mechanism 52 according to the present embodiment can lighten the transaxle 1 and reduce the production cost of the transaxle 1.

In the case that the cylindrical portions 91, 99 having the introduction bores 92, 98, respectively, as shown in the third and fourth embodiments, the cylindrical portions 91, 99 can be used at the places were the rotation members such as gears and the like are accommodated in the space surrounded by the casing.

The parking lock mechanism 52 may be constructed, for example, with the casing being formed at its given positions with introduction bores 92, 98. In the parking lock mechanism 52 thus constructed, the oil is discharged to the cylindrical portions 91, 99 through the introduction bores 92, 98 from the space accommodating therein gears to be supplied to the inner peripheral portion 71a of the sleeve 71, thereby lubricating the sliding surface of the parking cam 61.

In the above construction, the discharge property of the oil in the space surrounded by the casing is enhanced to reduce the agitation resistance of the gears and other moving elements, thereby making it possible to prevent the power transmission efficiency of the transaxle 1. In this construction, the introduction bores 92, 98 are formed in the casing to be positioned in the tooth line direction of the gear, thereby making it possible to direct the oil to the introduction bores 92, 98, and to enhance the discharge property of the oil.

In each of the above embodiments, the parking gear 51 has been explained to be securely mounted on the MG shaft 32, but the parking gear 51 may be securely mounted for example on the counter shaft 40 selected from among the rotation members provided on the power transmission path, resulting from the reason that the rotations of the front wheels 50L, 50R are required to be locked.

Although the parking lock mechanism according to the present embodiment has been explained to be applied to the power transmission apparatus having the motor generators MG1, MG2, the parking lock mechanism can, of course, be applied to a power transmission apparatus with no such motor generators MG1, MG2.

Although the parking lock mechanism according to the present embodiment has been explained to be applied to the shift-by-wire type, the parking lock mechanism can be applied to a wire type which is adapted to transmit the operation of the operation lever to the parking pawl through a wire.

In the above construction, the sliding resistance of the sliding portions between the parking pawl and the parking cam can be made constant in addition to the fact that the operation force of the driver can be lessened, thereby making it possible to prevent the operation feeling from being deteriorated.

Each of the previously mentioned embodiments has been raised as an example for explaining the invention, and thus the present invention is not limited to these embodiments. The scope of the present invention is required to be construed based on the claims. All the modifications and the alterations within the claims and the equivalents of the claims should be included within the scope of the invention.

As will be understood from the foregoing description, the parking lock mechanism of the power transmission apparatus according to the present invention can stably supply the lubrication oil to the sliding surface of the parking cam, and has advantageous effect to decrease the sliding resistance of the parking cam, so that the parking lock mechanism of the power transmission apparatus according to the present invention is useful as a parking lock mechanism of a power transmission apparatus for a vehicle such as an automotive vehicle and the like which can make it impossible for rotational elements and parts to be rotated.

REFERENCE SIGNS LIST

1: transaxle (power transmission apparatus)
5: engine side housing (casing)
6: extension housing (casing)
34a: motor accommodation chamber (accommodation chamber)
51: parking gear (rotation member)
52: parking lock mechanism
53: actuator (parking lock mechanism)
56: output shaft parking lock mechanism)
57: detent lever (parking lock mechanism)
58: detent spring (parking lock mechanism)
60: parking rod (parking lock mechanism)
61: parking cam (parking lock mechanism)
62: parking pawl (parking lock mechanism)
64: spring (parking lock mechanism)
71: sleeve (cylindrical member, first cylindrical member)
71a: inner peripheral portion (first inner peripheral portion)
71b: inclined surface
73: support portion (supply unit)
74: first guide rib (supply unit, guide portion)
81, 91: cylindrical portion (supply unit, cylindrical member, second cylindrical member)
81a, 91a, 99a: inner peripheral portion (second inner peripheral portion)
81b, 91b: upper notch (upper opening)
83, 84a, 84b, 87, 88, 89: guide rib (supply unit)
92, 98: introduction bore
95: bearing
96: rotation shaft
97: partition wall (supply unit)
97a: support portion
99: cylindrical portion (second cylindrical member)

The invention claimed is:

1. A parking lock mechanism of a power transmission apparatus, comprising:
a parking pawl engageable with and disengageable from a parking gear provided on a rotation member forming part of the power transmission apparatus, the rotation member being accommodated in a casing forming part of the power transmission apparatus, a parking rod axially movable in response to the operation of a shift lever to be operated by a driver, a parking cam fixedly mounted on the parking rod to be slidable together with the parking rod in response to the axial movement of the parking rod and to allow the parking pawl to be engaged with and disengaged from the parking gear, and a cylindrical member that slidably supports the parking cam, the cylindrical member being positioned with respect to the casing and supported on the casing, the parking lock mechanism further comprising a supply unit that supplies lubrication oil circulating in the casing to a sliding surface of the parking cam,
the supply unit being directly provided on the casing,
the cylindrical member being constituted by a first cylindrical member having a first inner peripheral portion having an inclined surface that axially slidably supports the parking cam to allow the parking cam to run on the inclined surface in response to the axial movement of the parking rod,
the supply unit being constituted by a second cylindrical member constructed to be provided on the casing to be held in abutment with an axial one end portion of the first cylindrical member to position the first cylindrical member with respect to the casing and to be supported on the casing,
the second cylindrical member having a second inner peripheral portion held in communication with the first inner peripheral portion of the first cylindrical member, and formed with an upper opening that introduces the lubrication oil circulating in the casing into the second peripheral portion.

2. A parking lock mechanism of a power transmission apparatus, comprising:
a parking pawl engageable with and disengageable from a parking gear provided on a rotation member forming part of the power transmission apparatus, the rotation member being accommodated in a casing forming part of the power transmission apparatus, a parking rod axially movable in response to the operation of a shift lever to be operated by a driver, a parking cam fixedly mounted on the parking rod to be slidable together with the parking rod in response to the axial movement of the parking rod and to allow the parking pawl to be engaged with and disengaged from the parking gear, and a cylindrical member that slidably supports the parking cam,
the cylindrical member being positioned with respect to the casing and supported on the casing, the parking lock mechanism further comprising a supply unit that supplies lubrication oil circulating in the casing to a sliding surface of the parking cam,
the supply unit being provided on a support member fixed to the casing, the cylindrical member being positioned and supported on the casing with respect to the support member,
the cylindrical member being constituted by a first cylindrical member having a first inner surface portion having an inclined surface that axially slidably supports the parking cam to allow the parking cam to run on the inclined surface in response to the axial movement of the parking rod,
the supply unit being constituted by a second cylindrical member provided on the support member to be held in abutment with an axial one end portion of the first cylindrical member to position the first cylindrical member with respect to the casing through the support member and to be supported on the casing,
the second cylindrical member having a second inner peripheral portion held in communication with the first inner peripheral portion of the first cylindrical member, and formed with an upper opening that introduces the lubrication oil circulating in the casing into the second peripheral portion.

3. The parking lock mechanism of the power transmission apparatus as set forth in claim 1, in which the second cylindrical member has a discharge opening that discharges the lubrication oil introduced into the second cylindrical member.

4. A parking lock mechanism of a power transmission apparatus, comprising:
- a parking pawl engageable with and disengageable from a parking gear provided on a rotation member forming part of the power transmission apparatus, the rotation member being accommodated in a casing forming part of the power transmission apparatus, a parking rod axially movable in response to the operation of a shift lever to be operated by a driver, a parking cam fixedly mounted on the parking rod to be slidable together with the parking rod in response to the axial movement of the parking rod and to allow the parking pawl to be engaged with and disengaged from the parking gear, and a cylindrical member that slidably supports the parking cam,
- the cylindrical member being positioned with respect to the casing and supported on the casing, the parking lock mechanism further comprising a supply unit that supplies lubrication oil circulating in the casing to a sliding surface of the parking cam,
- the casing having a partition wall that rotatably supports an axial one end portion of a rotation shaft through a bearing,
- the cylindrical member being constituted by a first cylindrical member having a first inner peripheral portion having an inclined surface that axially slidably supports the parking cam to allow the parking cam to run on the inclined surface in response to the axial movement of the parking rod,
- the partition wall being formed with an introduction bore, and having one side surface formed with a support portion that supports the rotation shaft through the bearing across the introduction bore and the other side surface formed with the second cylindrical member,
- the second cylindrical member having an axial one end portion and an axial other end portion, the axial one end portion being formed on the partition wall to have the second inner peripheral portion held in communication with the introduction bore, and the axial other end portion projecting from the axial one end portion toward the first cylindrical member and being abutted with the axial one end portion of the first cylindrical member to have the second inner peripheral portion held in communication with the first inner peripheral portion, the second cylindrical member constituting the supply unit that supplies the lubrication oil introduced into the second inner peripheral portion through the upper opening to the bearing through the introduction bore.

5. A parking lock mechanism of a power transmission apparatus, comprising:
- a parking pawl engageable with and disengageable from a parking gear provided on a rotation member forming part of the power transmission apparatus, the rotation member being accommodated in a casing forming part of the power transmission apparatus, a parking rod axially movable in response to the operation of a shift lever to be operated by a driver, a parking cam fixedly mounted on the parking rod to be slidable together with the parking rod in response to the axial movement of the parking rod and to allow the parking pawl to be engaged with and disengaged from the parking gear, and a cylindrical member that slidably supports the parking cam,
- the cylindrical member being positioned with respect to the casing and supported on the casing, the parking lock mechanism further comprising a supply unit that supplies lubrication oil circulating in the casing to a sliding surface of the parking cam,
- the casing having a partition wall defining in the casing an accommodation chamber that accommodates a rotation motor therein and having one side surface facing the rotation motor and the other side surface facing the cylindrical member,
- the cylindrical member being constituted by a first cylindrical member having a first inner peripheral portion having an inclined surface that axially slidably supports the parking cam to allow the parking cam to run on the inclined surface in response to the axial movement of the parking rod,
- the partition wall being formed with an introduction bore, and provided with a second cylindrical member projecting from the introduction bore toward the first cylindrical member to be abutted with an axial one end portion of the first cylindrical member and having a second inner peripheral portion held in communication with the first inner peripheral portion of the first cylindrical member, the partition wall constituting the supply unit that supplies the lubrication oil having cooled the rotation motor to the sliding surface of the parking cam from the introduction bore through the first inner peripheral portion and the second inner peripheral portion.

6. The parking lock mechanism of the power transmission apparatus as set forth in claim 2, in which the second cylindrical member has a discharge opening that discharges the lubrication oil introduced into the second cylindrical member.

* * * * *